US009705380B2

(12) United States Patent
Nagase et al.

(10) Patent No.: US 9,705,380 B2
(45) Date of Patent: Jul. 11, 2017

(54) ELECTRIC MOTOR EQUIPPED WITH DECELERATION DEVICE

(71) Applicant: Mitsuba Corporation, Kiryu-shi, Gunma (JP)

(72) Inventors: Yuichi Nagase, Kiryu (JP); Yoshichika Kawashima, Kiryu (JP); Teppei Tokizaki, Kiryu (JP)

(73) Assignee: Mitsuba Corporation, Kiryu-shi, Gunma (JP)

( * ) Notice: Subject to any disclaimer, the term of this patent is extended or adjusted under 35 U.S.C. 154(b) by 13 days.

(21) Appl. No.: 14/358,062

(22) PCT Filed: Dec. 10, 2012

(86) PCT No.: PCT/JP2012/081943
§ 371 (c)(1),
(2) Date: May 14, 2014

(87) PCT Pub. No.: WO2013/085056
PCT Pub. Date: Jun. 13, 2013

(65) Prior Publication Data
US 2014/0319948 A1    Oct. 30, 2014

(30) Foreign Application Priority Data

Dec. 8, 2011 (JP) ................................. 2011-268505
Mar. 29, 2012 (JP) ................................. 2012-077103
Dec. 6, 2012 (JP) ................................. 2012-266819

(51) Int. Cl.
*H02K 5/10*     (2006.01)
*H02K 7/10*     (2006.01)
(Continued)

(52) U.S. Cl.
CPC ............. *H02K 7/116* (2013.01); *H02K 5/145* (2013.01); *H02K 11/25* (2016.01); *H02K 2203/03* (2013.01)

(58) Field of Classification Search
CPC ........... H02K 7/116; H02K 15/00; B60K 6/48
(Continued)

(56) References Cited

U.S. PATENT DOCUMENTS 4,884,844 A     12/1989  Kershaw et al.
4,920,814 A *    5/1990  Espy ............................... 74/89.3
(Continued)

FOREIGN PATENT DOCUMENTS

DE       2210243 A1    9/1973
DE       2656191 A1    6/1978
(Continued)

OTHER PUBLICATIONS

Japanese Patent Office, International Search Report issued in Application No. PCT/JP2012/081943, mailed Feb. 19, 2013, 4 pp.
(Continued)

*Primary Examiner* — Jose Gonzalez Quinones
(74) *Attorney, Agent, or Firm* — Wood Herron & Evans LLP

(57) ABSTRACT

An electric motor equipped with deceleration device (1) is provided with a main shaft component (200) that is formed substantially in a circular rod shape, and has one end portion (201) that is rotatably supported at a substantial center of a bottom portion (111) of a motor housing (110) and another end portion (202) that protrudes towards an outer side through an aperture in the motor housing (110), the main shaft component (200) is fixed to the motor housing (110) via the one end portion (201). An armature (130) is disposed inside the motor housing (110) so as to be on the same axis as the main shaft component (200) and so as to surround the
(Continued)

main shaft component (200), and a deceleration device (10) is disposed between the armature (130) and the other end portion (202) of the main shaft component (200) so as to surround the main shaft component (200), and an output component (16), which is formed in a toroidal shape, is disposed on the same axis as the main shaft component (200) so as to surround the main shaft component (200).

6 Claims, 19 Drawing Sheets

(51) Int. Cl.
    *F16H 25/20*     (2006.01)
    *H02K 7/116*     (2006.01)
    *H02K 5/14*     (2006.01)
    *H02K 11/25*     (2016.01)

(58) Field of Classification Search
    USPC ... 310/75 R, 77, 83, 92, 93, 97, 98, 99, 120, 310/123, 265, 267, 102 R; 74/89.3
    See application file for complete search history.

(56) References Cited

U.S. PATENT DOCUMENTS

| | | | |
|---|---|---|---|
| 7,354,370 B2 * | 4/2008 | Sesselmann | 475/149 |
| 2001/0029219 A1 | 10/2001 | Minegishi et al. | |
| 2006/0205559 A1 * | 9/2006 | Sesselmann | E05F 11/483 475/331 |
| 2009/0134736 A1 * | 5/2009 | Yamamoto | H02K 1/148 310/203 |
| 2009/0146510 A1 * | 6/2009 | Uchimura | 310/42 |
| 2010/0176666 A1 | 7/2010 | Abe et al. | |
| 2012/0032541 A1 * | 2/2012 | Chen et al. | 310/83 |

FOREIGN PATENT DOCUMENTS

| | | | | |
|---|---|---|---|---|
| DE | 19708310 A1 | 9/1998 | | |
| DE | 29924088 U1 | 11/2001 | | |
| DE | 102008053567 A1 * | 4/2010 | ............ | H02K 5/148 |
| JP | 60-095250 A | 6/1985 | | |
| JP | 04-088358 A | 7/1992 | | |
| JP | 1032958 A | 2/1998 | | |
| JP | 2001245936 A | 9/2001 | | |
| JP | 2001339907 A * | 12/2001 | | |
| JP | 2002315270 A | 10/2002 | | |
| JP | 2003-314634 A | 11/2003 | | |
| JP | 2008-164135 A | 7/2008 | | |
| JP | 2008-215550 A | 9/2008 | | |
| JP | 2010213491 A | 9/2010 | | |
| JP | 2011-021725 A | 2/2011 | | |
| JP | 2011-185311 A | 9/2011 | | |
| JP | 2011199987 A | 10/2011 | | |
| JP | 2011231887 A * | 11/2011 | | |
| WO | 9702968 A2 | 1/1997 | | |
| WO | 0120753 A1 | 3/2001 | | |
| WO | 0189063 A1 | 11/2001 | | |
| WO | 2004015306 A2 | 2/2004 | | |
| WO | 2005021915 A1 | 3/2005 | | |

OTHER PUBLICATIONS

European Patent Office, Extended European Search Report issued in corresponding European Patent Application No. 12855172.8 dated Oct. 15, 2015.

Japanese Patent Office, Office Action in Japanese Patent Application No. JP2012-266819 dated May 9, 2016.

Japanese Patent Office, Office Action issued in corresponding Japanese Patent Application No. 2012-266819 mailed on Dec. 6, 2016, 9 pages.

* cited by examiner

ELECTRIC MOTOR EQUIPPED WITH DECELERATION DEVICE

TECHNICAL FIELD

The present invention relates to an electric motor equipped with deceleration device and, in particular, to an electric motor equipped with deceleration device that operates a power window system of a vehicle.

Priority is claimed on Japanese Patent Application Nos. 2011-268505, filed Dec. 8, 2011, 2012-077103, filed Mar. 29, 2012, and 2012-266819, filed Dec. 6, 2012, the contents of which are incorporated herein by reference.

BACKGROUND ART

Generally, a worm deceleration mechanism is used for the deceleration apparatus in an electric motor equipped with deceleration device that operates the power window system of a vehicle. An electric motor equipped with deceleration device in which this worm deceleration mechanism is used has a structure in which a substantially rod-shaped electric motor is mounted from the outside on a side wall of a substantially cylinder-shaped deceleration device that contains a worm wheel inside it (see, for example, Patent document 1).

CITATION LIST

Patent Literature

[Patent Literature 1] Japanese Unexamined Patent Application (JP-A) No. 2011-21725

SUMMARY OF THE INVENTION

Problems to be Solved by the Invention

Because of this, the external appearance of the aforementioned electric motor equipped with deceleration device is formed in a p-shape (or a q-shape), and has a structure in which the substantially rod-shaped electric motor protrudes in a radial direction in a direction that is orthogonal to an output shaft (i.e., an output component) of the deceleration device. Because the electric motor has a structure in which it protrudes from the deceleration device in this manner, when this electric motor equipped with deceleration device is attached to the power window system inside the door of a vehicle, sufficient space around the output component of the deceleration device is essential in order for the electric motor to be installed inside the door.

The present invention is conceived in view of the above-described circumstances, and it is an object thereof to provide an electric motor equipped with a small-sized deceleration device in which the electric motor does not protrude in a radial direction from the output component of the deceleration device.

Means for Solving the Problem

According to a first aspect of the present invention, an electric motor equipped with deceleration device is provided with: an electric motor including a motor housing which is in the shape of a cylinder having a bottom portion, motor magnets that are disposed on an internal wall of the motor housing, an armature that is rotatably disposed on an inner side of the motor magnets inside the motor housing, and a power supply device that has brushes and supplies current to the armature; and with a deceleration device having an output component that decelerates and then outputs a rotation of the armature of the electric motor. In addition, this electric motor equipped with deceleration device is provided with a main shaft component that is formed substantially in a cylindrical rod shape, and has one end portion that is rotatably supported at a substantial center of the bottom portion of the motor housing and another end portion that protrudes towards an outer side through an aperture in the motor housing, and the main shaft component is fixed to the motor housing through the one end portion. Furthermore, the armature is disposed inside the motor housing so as to be on the same axis as the main shaft component and so as to surround the main shaft component, and the deceleration device is disposed between the armature and the other end portion of the main shaft component so as to surround the main shaft component, and the output component, which is formed in a toroidal shape, is disposed on the same axis as the main shaft component so as to surround the main shaft component.

The electric motor equipped with deceleration device according to the above-described aspect is provided with a main shaft component having one end portion that is attached to the substantial center of the bottom portion of the motor housing, and the armature of the electric motor and the deceleration device are both arranged so as to be on the same axis as the main shaft component and so as to surround this main shaft component. As a result of both the electric motor and the deceleration device being positioned in this way so as to be on the same axis via the main shaft component, the electric motor equipped with deceleration device according to the above-described aspect is small in size, and the electric motor does not protrude outwards in a radial direction from the output component of the deceleration device.

Moreover, in the electric motor equipped with deceleration device according to the above-described aspect, the electric motor and the deceleration device are both positioned so as to surround the main shaft component, and the electric motor equipped with deceleration device has a structure in which the shaft component effectively penetrates both the electric motor and the deceleration device. Because of this, the electric motor and the deceleration device have a structure in which each of them does not have their own individual rotation axis, and the main shaft is capable of being shared as a common rotation axis. Therefore, the electric motor and the deceleration device are capable of being positioned adjacent to each other in the axial direction in a compact space. Accordingly, the electric motor equipped with deceleration device has a flat shape with a shortened length in the axial direction, and, therefore, has a small size in the axial direction.

According to a second aspect of the present invention, in the electric motor equipped with deceleration device according to the first aspect of the present invention, the deceleration device is provided with: a fixed gear that is fixed to the motor housing on the same axis as the main shaft component; a linking component that rotates in synchronization with the armature; a first planetary gear that is axially supported by the linking component such that it is freely rotatable and that meshes with the fixed gear; and a second planetary gear that rotates in synchronization with the first planetary gear, wherein the output component is rotatably disposed relative to the motor housing and meshes with the second planetary gear.

In the electric motor equipped with deceleration device according to the above-described aspect, the deceleration device is what is known as a differential gear reducer that, as is described above, is provided with a fixed gear that is fixed to the motor housing, a linking component that rotates in synchronization with the armature, a first planetary gear that is axially supported on the linking component such that it is freely rotatable and that meshes with the fixed gear, a second planetary gear that rotates in synchronization with the first planetary gear, and an output component that meshes with the second planetary gear and serves as an output gear. Because a differential gear reducer is capable of being formed by a spur gear, and because the transmission efficiency between spur gears is high, according to the electric motor equipped with deceleration device according to the above-described aspect, it is possible to increase the output efficiency.

Moreover, in a differential gear reducer, when an attempt is made to rotate the output component (i.e., the output gear) using external force, braking force is generated that inhibits the orbital motion of the planetary gears. Because of this, the differential gear reducer has a function of locking up inside the deceleration mechanism using this braking force. As a result, according to the electric motor equipped with deceleration device according to the above-described aspect, it is possible to avoid the output component being rotated from the outside.

Moreover, in a differential gear reducer, each of the plate-shaped spur gears (i.e., the fixed gears, planetary gears, and output gears) that make up the deceleration mechanism is capable of being placed adjacent to each other in an axial direction. Because of this, the length in the axial direction of the differential gear reducer can be shortened. As a result, the electric motor equipped with deceleration device of the above-described aspect has a flat shape with a shortened length in the axial direction, and has a small size in the axial direction.

According to a third aspect of the present invention, in the electric motor equipped with deceleration device according to the first or second aspects of the present invention, the other end portion of the main shaft component is rotatably supported by a motor bracket on which the electric motor equipped with deceleration device is mounted, and a drum wheel around which a wire that operates a power window system is wound, and that rotates in synchronization with the output component is linked to the output component.

In the electric motor equipped with deceleration device according to the above-described aspect, a main shaft component, which substantially forms the rotation shaft of the electric motor and the deceleration device, has one end portion that is rotatably supported by the motor housing and another end portion that is rotatably supported by the motor bracket on which the electric motor equipped with deceleration device is mounted. As a result of the other end portion not being fixed to the inside of the electric motor equipped with deceleration device, but instead, as is described above, being rotatably supported by the motor bracket on which the electric motor equipped with deceleration device is mounted, it is not necessary for a separate portion in the axial direction to be provided inside the motor in order to rotatably support the main shaft component. Because of this, the length in the axial direction of the electric motor equipped with deceleration device according to the above-described aspect can be shortened even further, and it can be made even flatter and smaller.

In the electric motor equipped with deceleration device according to the above-described aspect, a drum wheel around which a wire that operates a power window system is wound, and that rotates in synchronization with the output component is linked to the output component. Namely, the electric motor equipped with deceleration device that, as is described above, is flat and small in size is used as an actuator that operates a power window system. In other words, as a result of the electric motor equipped with deceleration device being applied to the power window system, the overall size of the power window system can be made smaller.

According to a fourth aspect of the present invention, in the electric motor equipped with deceleration device according to the first aspect of the present invention, the armature is provided with a commutator having a plurality of commutator pieces that are arranged at the same pitch from each other in a radiating pattern so as to extend in orthogonal directions relative to an axis of the armature, and over which the brushes are capable of sliding.

According to a fifth aspect of the present invention, in the electric motor equipped with deceleration device according to the fourth aspect of the present invention, the power supply device includes: a plate-shaped main body component that is made from a resin material, and spring components that are formed by conductive, elastic components, and are attached to a facing surface of the main body component that faces the commutator pieces, and that is capable of energizing the current that is supplied to the power supply device, wherein the brushes are electrically and mechanically connected to a displacement portion of the spring components.

According to a sixth aspect of the present invention, in the electric motor equipped with deceleration device according to the first aspect or second aspect of the present invention, the other end portion of the main shaft component is rotatably supported by a motor bracket on which the electric motor equipped with deceleration device is mounted, and the output component is formed integrally with a drum wheel around which a wire that operates a power window system is wound, and that rotates in synchronization with the output component.

Effects of the Invention

According to the above-described aspects, it is possible to provide an electric motor equipped with a small-sized deceleration device in which the electric motor is small in size and does not protrude in a radial direction from the output component of the deceleration device.

DESCRIPTION OF EMBODIMENTS

An electric motor equipped with deceleration device according to a first embodiment of the present invention will now be described based on FIG. 1 through FIG. 8.

Figure 1:
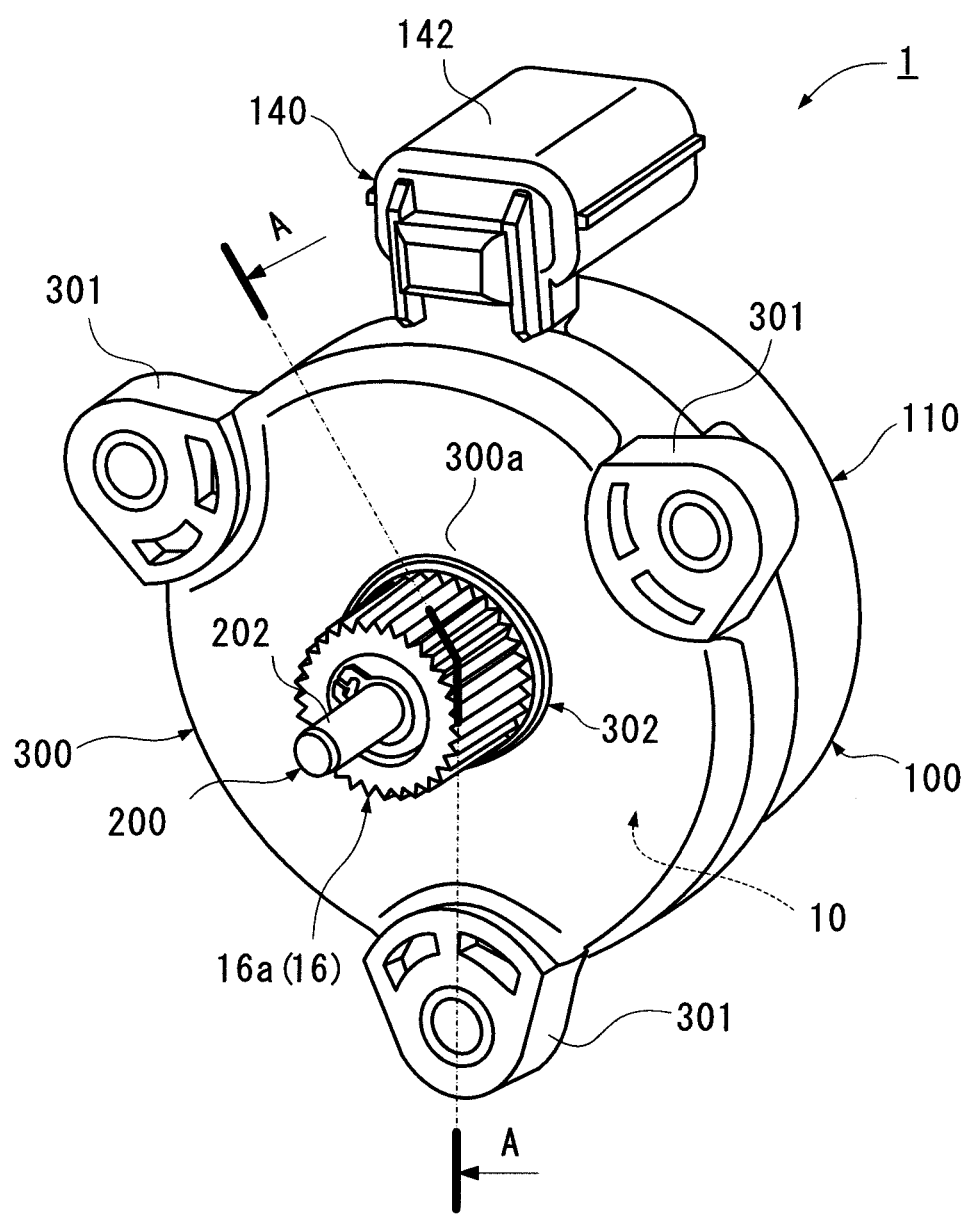
FIG. 1 is a perspective view showing an electric motor that is equipped with deceleration device according to a first embodiment of the present invention.
Figure 2:
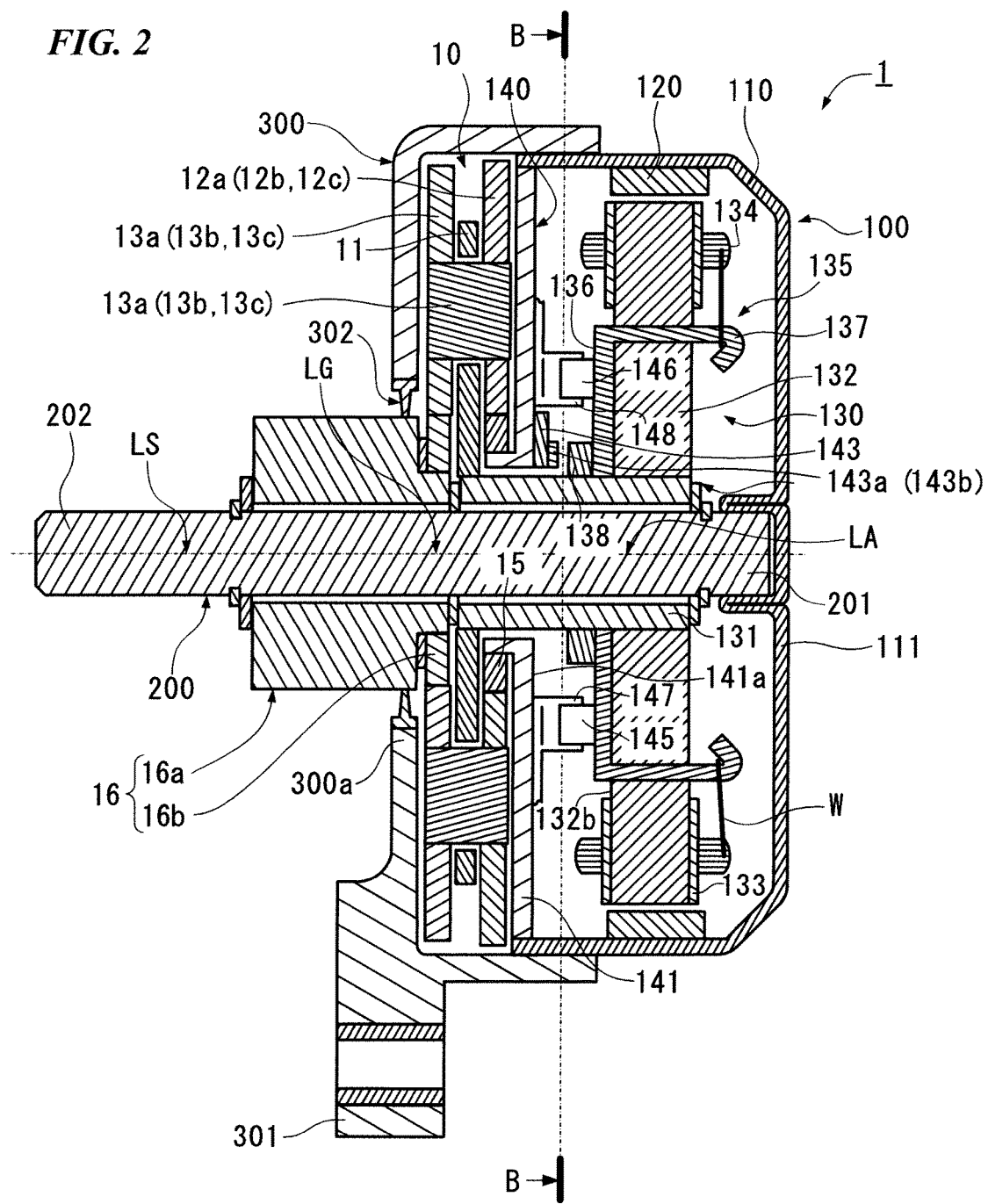
FIG. 2 is a vertical cross-sectional view of the electric motor equipped with deceleration device taken along a cross-section A-A in FIG. 1.

As is shown in FIG. 1 and FIG. 2, an electric motor equipped with deceleration device 1 is provided with an electric motor 100, a deceleration device 10, a main shaft component 200, and a case component 300.

Figure 3:
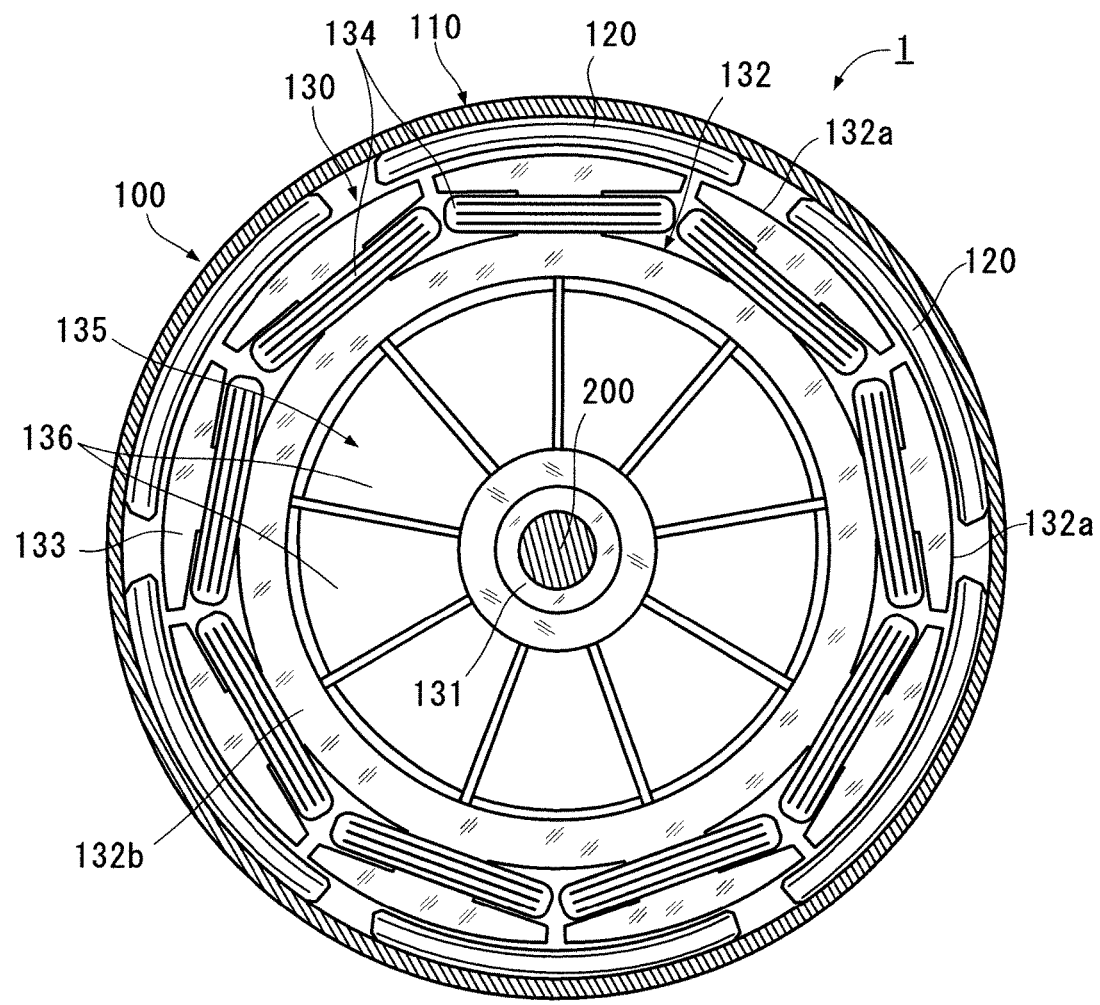
FIG. 3 is a horizontal cross-sectional view of the electric motor equipped with deceleration device taken along a cross-section B-B in FIG. 2.

As is shown in FIG. 2 and FIG. 3, the electric motor 100 is provided with a motor housing 110 which is in the shape of a cylinder having a closed bottom portion, a plurality of motor magnets 120 that are disposed on an internal wall of the motor housing 110, an armature 130 that is disposed on the inner side of the motor magnets 120 such that it is freely rotatable inside the motor housing 110, and with a power supply device 140 that has brushes 145 and 146, and that supplies current to the armature 130.

Figure 4:
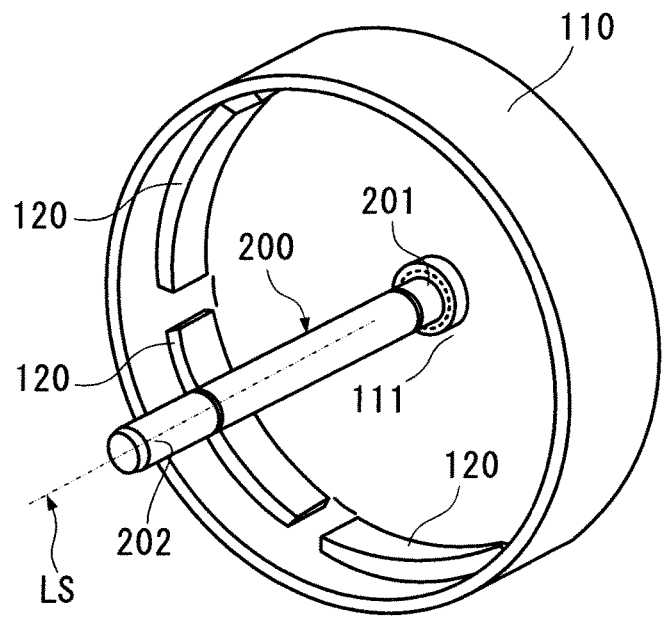
FIG. 4 shows a motor housing and main shaft component of the electric motor equipped with deceleration device according to the first embodiment of the present invention.

Moreover, as is shown in FIG. 2 and FIG. 4, the main shaft component 200 that is provided in the electric motor equipped with deceleration device 1 is formed in a substantially circular rod shape. One end portion 201 of the main shaft component 200 is rotatably supported by a bottom portion 111 of the motor housing 110, while another end portion 202 of the main shaft component 200 protrudes towards the outside through an aperture in the motor housing 110. Namely, the main shaft component 200 is fixed to the motor housing 110 through the one end portion 201.

Figure 5:
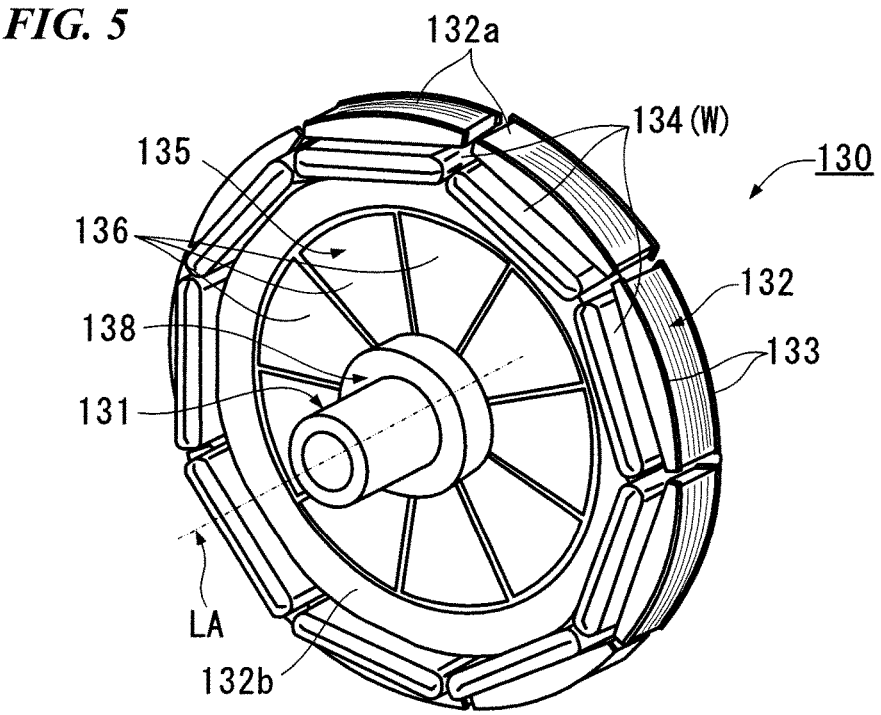
FIG. 5 is a perspective view of an armature of the electric motor equipped with deceleration device according to the first embodiment of the present invention.

As is shown in FIG. 2 and FIG. 5, the armature 130 of the electric motor 100 is provided with a cylinder-shaped armature shaft 131 that is hollow and is formed in a rod shape, and an armature core 132 that is formed by stacking a plurality of steel plates and that is fixed to the outer circumferential surface of the armature shaft 131 by being fitted around the outside thereof, insulators 133 and 133 that are disposed on both end surfaces of the armature core 132, coils 134, a ring magnet 138, and a commutator 135.

Here, a plurality of teeth 132a that are disposed in a radial pattern at the same pitch from each other are formed on the armature core 132. The coils 134 are formed by winding magnet wire W in tightly concentrated winds onto these teeth 132a from the outside of the insulators 133 and 133. In the ring magnet 138 mutually different polarities are formed alternatingly in the circumferential direction, and the ring magnet 138 is fitted from the outside around the outer circumferential surface of the armature shaft 131 so as to be fixed thereto in a state of contact with one end surface 132b of the armature core 132.

The commutator 135 is formed by a plurality of plate-shaped commutator pieces 136 along which the brushes 145 and 146 are capable of sliding. Here, each of the commutator pieces 136 is placed at the same pitch from each other so as to radiate outwards in an orthogonal direction relative to an axis LA of the armature 130, and is attached to the one end surface 132b of the armature core 132. Rod-shaped hooking portions 137 are formed integrally with an outer circumferential portion on an outer side in a radial direction of the commutator pieces 136. Here, the hooking portions 137 penetrate the armature core 132 and protrude on the opposite side of the commutator pieces 136 from the armature core 132. End portions of the hooking portions 137 are bent back towards the armature core 132, and the magnet wire W that forms the coils 134 is hooked around these end portions.

As is shown in FIG. 2 and FIG. 3, the armature 130 is positioned so as to surround the main shaft component 200 and so as to be coaxial with the main shaft component 200, namely, such that the axis LA of the armature 130 is coaxial with the axis LS of the main shaft component 200. In this state, the armature 130 is placed inside the motor housing 110 and is then installed in the motor 1. When it is installed, the armature shaft 131 of the armature 130 is engaged on the outside of the main shaft component 200 so as to be freely rotatable.

Figure 6:
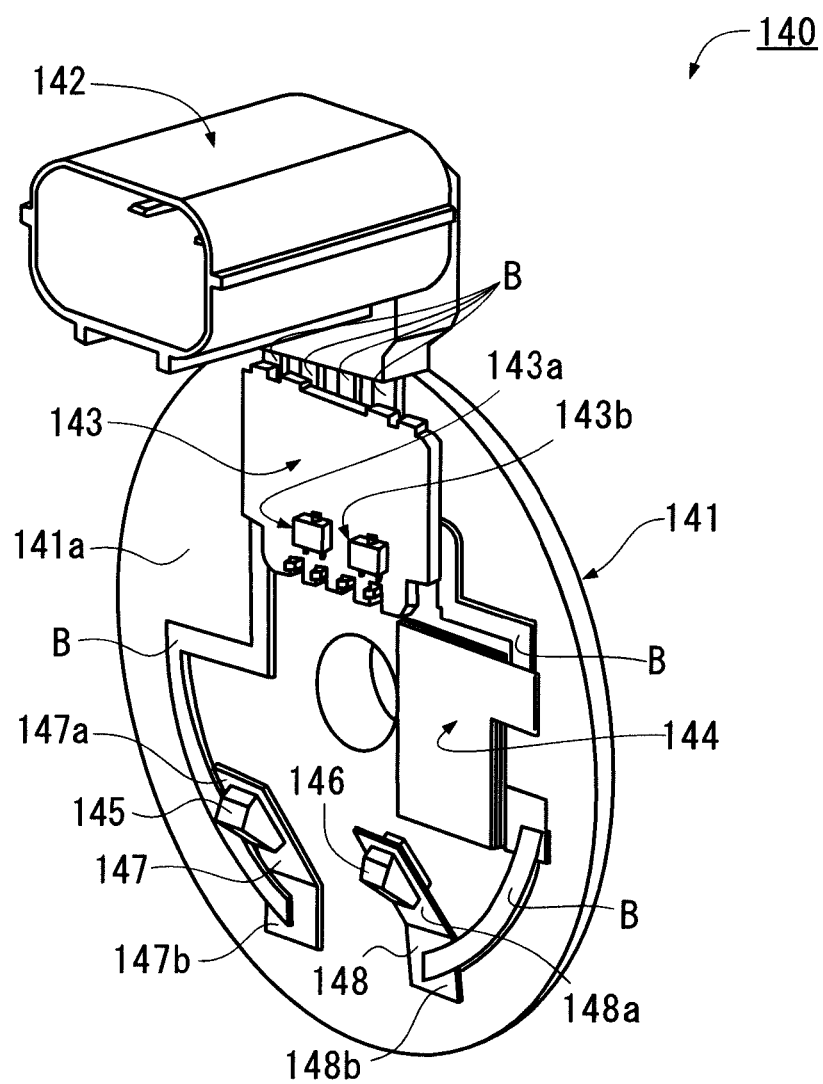
FIG. 6 is a perspective view of a power supply device in the electric motor equipped with deceleration device according to the first embodiment of the present invention.

Next, the power supply device 140 of the electric motor 100 will be described based on FIG. 2 and FIG. 6.

The power supply device 140 is provided with a main body component 141 that is formed from a resin material in a flat, circular disk shape, a connector 142 to which an external connector (not shown) is connected, a control substrate 143, a PCT element 144 which is a current control element, spring components 147 and 148, and brushes 145 and 146 that are attached respectively to the spring components 147 and 148. Here, Hall IC 143*a* and 143*b* that serve as sensor elements are attached to a top surface of the control substrate 143.

In addition, as is shown in FIG. 2, the power supply device 140 is installed in the motor 100 such that the main body component 141 thereof faces the armature 130, and the aperture in the motor housing 110 is covered by the main body component 141. Here, the Hall IC 143*a* and 143*b* are positioned facing the ring magnet 138 that is provided in the armature 130, and rotations of the armature 130 are detected by the Hall IC 143*a* and 143*b*.

Moreover, the control substrate 143, the PCT element 144, and the spring components 147 and 148 are all placed on the main body component 141 integrally with a facing surface 141*a* thereof that faces the armature 130. Here, the spring components 147 and 148 are each formed by plate-shaped components that have elasticity and are conductive. The spring components 147 and 148 are formed by folding over these plate shaped elastic components, and are attached to the main body component 141 via fixing portions 147*b* and 148*b* that are located at one end of the spring components 147 and 148 respectively. The brushes 145 and 146 are attached to displacement portions 147*a* and 148*a* that are located at the other end of the spring components 147 and 148 respectively, and are capable of being freely displaced in the axial direction. These brushes 145 and 146 slide against the commutator pieces 136 of the armature 130.

The connector 142, the control substrate 143, the PCT element 144, and the spring components 147 and 148 are electrically connected to each other via a bus bar B. Power that is supplied to the connector 142 from an external connector (not shown) via this bus bar B passes through the control substrate 143 and is supplied to the brushes 145 and 146 via the spring components 147 and 148. The power is then supplied to the coils 134 of the armature 130 via the brushes 145 and 146.

As is described above, the armature 130 of the electric motor 100 is provided with a structure which the hooking portions 137 of the commutator 135 to which the magnet wire W is connected protrude on the opposite side of the armature core 132 from the side where the communicator pieces 136 are located. Because of this, the electric motor 100 is provided with a structure that makes it possible for the power supply device 140 to be positioned adjacent to the armature 130 in the axial direction. As a consequence of this, the electric motor 100 is provided with a compact, namely, flat structure in the axial direction.

Furthermore, in the power supply device 140, the spring components 147 and 148 that urge the brushes 145 and 146 towards the armature 130 are formed in a bent shape, and are compact in the axial direction as a result of being provided directly on the main body component 141 of the power supply device 140, and the brushes 145 and 146 are attached both electrically and mechanically directly to these spring components 147 and 148. Because of this, the power supply device 140 is capable of being located adjacent to the armature 130 in the axial direction, so that the electric motor 100 is capable of being provided with an even more compact, namely, flat structure in the axial direction.

Next, the deceleration device 10 that is provided in the electric motor equipped with deceleration device 1 will be described based on FIG. 2, as well as FIG. 7 and FIG. 8.

Figure 7:
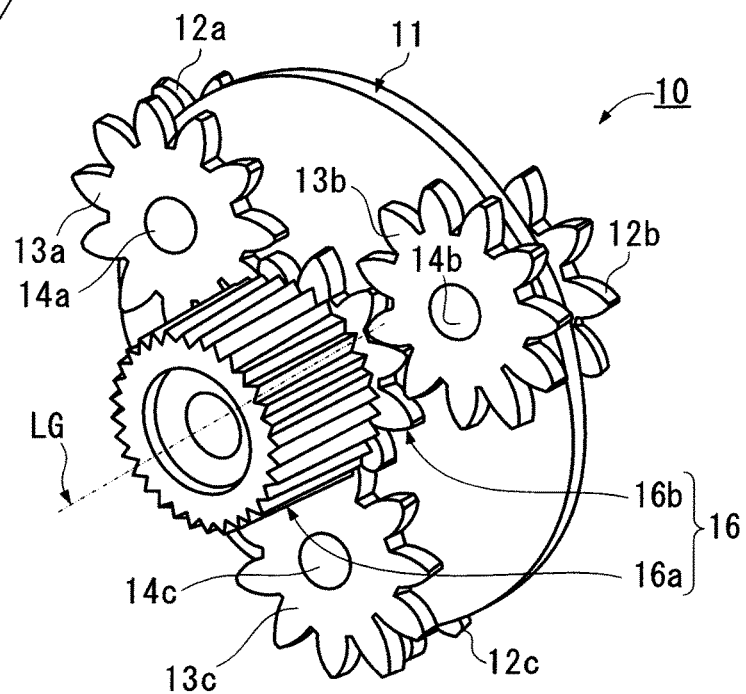
FIG. 7 is a perspective view of a deceleration device in the electric motor equipped with deceleration device according to the first embodiment of the present invention.
Figure 8:
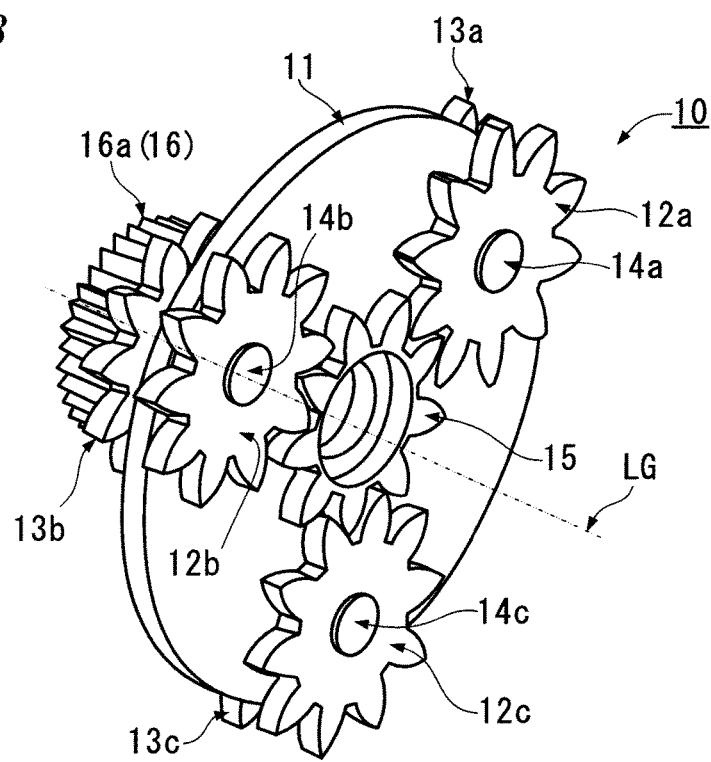
FIG. 8 is a perspective view of a deceleration device in the electric motor equipped with deceleration device according to the first embodiment of the present invention.

As is shown in FIG. 7 and FIG. 8, the deceleration device 10 is provided with a circular disk-shaped linking component 11, three first planetary gears 12*a*, 12*b*, and 12*c* that each have external teeth, three second planetary gears 13*a*, 13*b*, and 13*c* that each have external teeth, three linking shafts 14*a*, 14*b*, and 14*c* that link the first planetary gears 12*a*, 12*b*, and 12*c* to the second planetary gears 13*a*, 13*b*, and 13*c*, a fixed gear 15 that is formed in a toroidal shape and has external teeth, and an output component 16 that is formed in a toroidal shape. Here, the output component 16 is provided with an output gear 16*b* that is formed in a toroidal shape and has external teeth, and with a linking component 16*a* that is formed in a toroidal shape and that is integrally attached to the output gear 16*b*.

The first planetary gears 12*a*, 12*b*, and 12*c* are arranged at identical pitches of 120° intervals on the linking component 11 so as to be concentrically centered on the axis LG of the deceleration device 10. In addition, the first planetary gears 12*a*, 12*b* and 12*c* are supported on the linking component 11 by the linking shafts 14*a*, 14*b*, and 14*c* such that they are freely rotatable. Furthermore, the second planetary gears 13*a*, 13*b*, and 13*c* rotate via the linking shafts 14*a*, 14*b* and 14*c* in synchronization with the first planetary gears 12*a*, 12*b*, and 12*c*. The first planetary gears 12*a*, 12*b*, and 12*c* mesh with the fixed gear 15 that is placed concentrically on the axis LG, while the output component 16 is placed concentrically on the axis LG and meshes with the second planetary gears 13*a*, 13*b*, and 13*c*.

Furthermore, as is shown in FIG. 2, the deceleration device 10 is positioned so as to surround the main shaft component 200 between the armature 130 of the electric motor 100 and the other end portion 202 of the main shaft component 200. At this time, the axis LG of the deceleration device 10 and the axis LS of the main shaft component 200 are the same axis, and the fixed gear 15, which is formed in a toroidal shape, and the output component 16 are located on the same axis so as to surround the main shaft component 200. Moreover, the fixed gear 15 is attached to the main body component 141 of the power supply device 140. The fixed gear 15 is fixed to the motor housing 110 via the power supply device 140, and the output component 16 is engaged with the main shaft component 200 such that it is freely rotatable. Namely, the output component 16 is installed such that it is freely rotatable relative to the motor housing 110.

Here, the linking component 11 of the deceleration device 10 is integrally attached to the armature shaft 131 of the electric motor 100, and the linking component 11 rotates in synchronization with the armature 130. The rotation of the armature 130 of the electric motor 100 is decelerated by the deceleration device 10 which is configured in the above-described manner, and a decelerated output is output from the output component 16 of the deceleration device 10.

The substantially cylindrical case component 300 has a closed bottom portion and is mounted to the motor bracket 110 so as to cover the deceleration device 10. Here, a hollow portion is formed in the bottom portion 300*a* of the case component 300, and the output component 16 of the deceleration device 10 is inserted through this hollow portion. A sealing component 302 that is in contact with an external wall of the output component 16 is attached to an internal wall of the hollow portion and seals the gap that is formed between the case component 300 and the output component 16. In this manner, the deceleration device 10 is covered by the case component 300 and is sealed by the sealing component 302, and is thereby protected from external dust or moisture.

Figure 9:
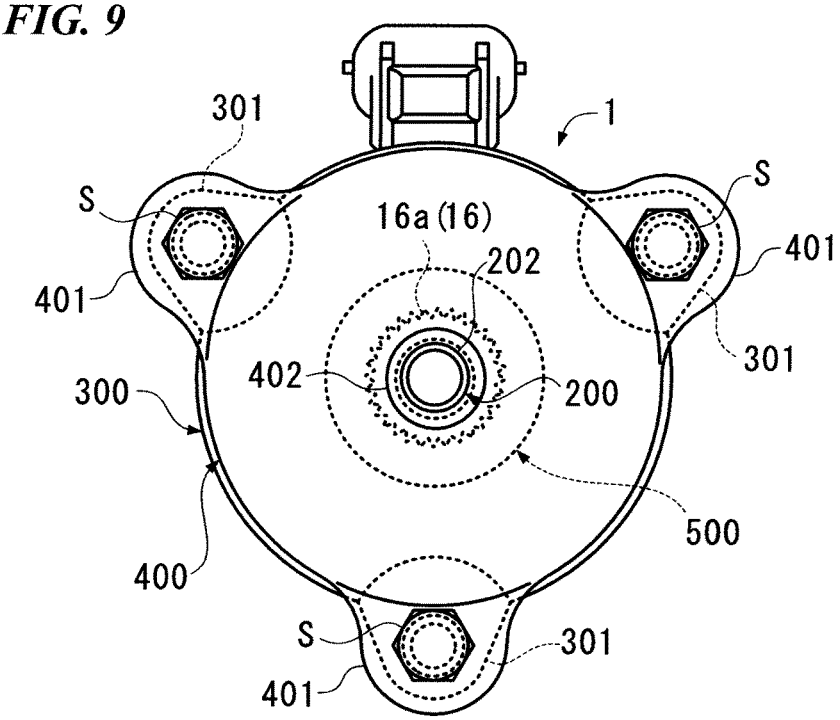
FIG. 9 is a frontal view illustrating a method of mounting the electric motor equipped with deceleration device according to the first embodiment of the present invention onto a motor bracket.
Figure 10:
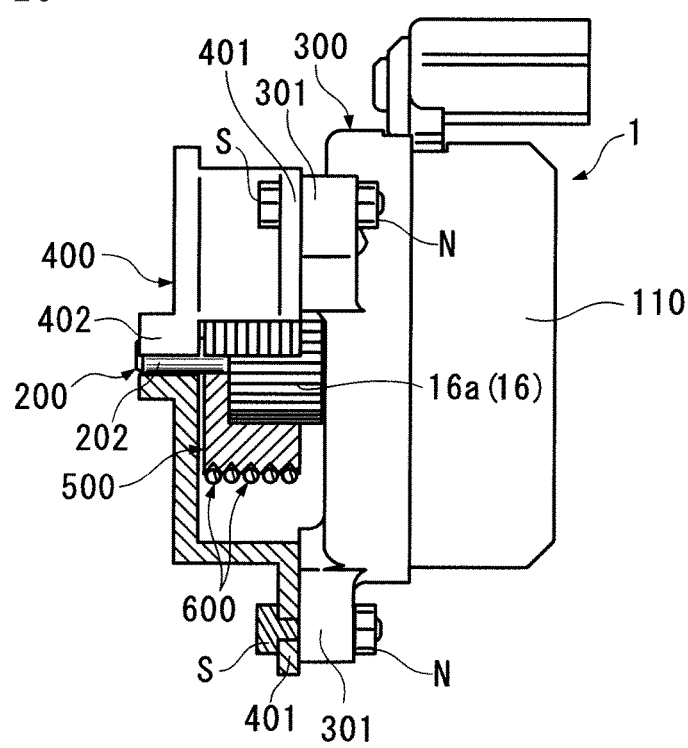
FIG. 10 is a side view illustrating a method of mounting the electric motor equipped with deceleration device according to the first embodiment of the present invention onto a motor bracket.

Next, the mounting of the electric motor equipped with deceleration device 1 onto a power window system will be described based on FIG. 9 and FIG. 10.

The electric motor equipped with deceleration device 1 is mounted on a motor bracket 400 that is provided in a power window system. This mounting is achieved by bringing a mounting portion 301 that is provided on the case component 300 of the electric motor 1 into contact with a mounting portion 401 of the motor bracket 400, and by fastening the mounting portion 401 to the mounting portion 301 with bolts S and nuts N.

During the mounting of the electric motor 1 onto the motor bracket 400, the other end portion 202 of the main shaft component 200 of the electric motor 1 is rotatably supported by a holding portion 402 of the motor bracket 400. Moreover, a drum wheel 500 around which wire 600 is wound is attached to the linking component 16a of the output component 16, so that the drum wheel 500 rotates in synchronization with the output component 16. Here, the wire 600 that is wound around the drum wheel 500 is an operating device that enables the power window system to operate, and the power window system is operated via the wire 600 as a result of the electric motor equipped with deceleration device 1 being operated.

Second Embodiment

Next, an electric motor equipped with deceleration device 700 according to a second embodiment of the present invention will be described based on FIG. 11 and FIG. 12. Note that the electric motor equipped with deceleration device 700 of the second embodiment differs from the electric motor equipped with deceleration device 1 of the first embodiment mainly in the structure of the deceleration device. Accordingly, hereinafter, the deceleration device will be described, while the remaining portions will be given the same descriptive symbols as above and no description thereof will be given.

Figure 11:
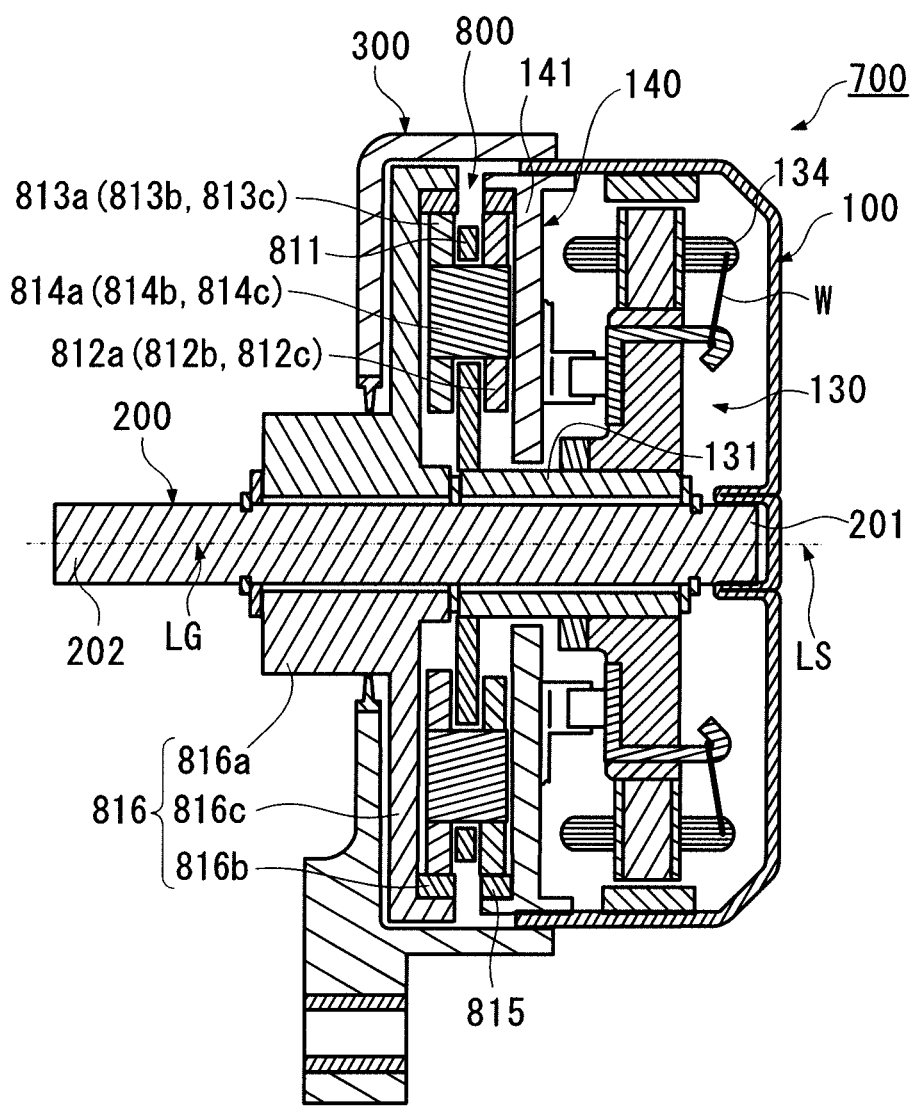
FIG. 11 is a vertical cross-sectional view of an electric motor equipped with deceleration device according to a second embodiment of the present invention.

As is shown in FIG. 11, the electric motor equipped with deceleration device 700 is provided with the electric motor 100, a deceleration device 800, the main shaft component 200, and the case component 300.

Figure 12:
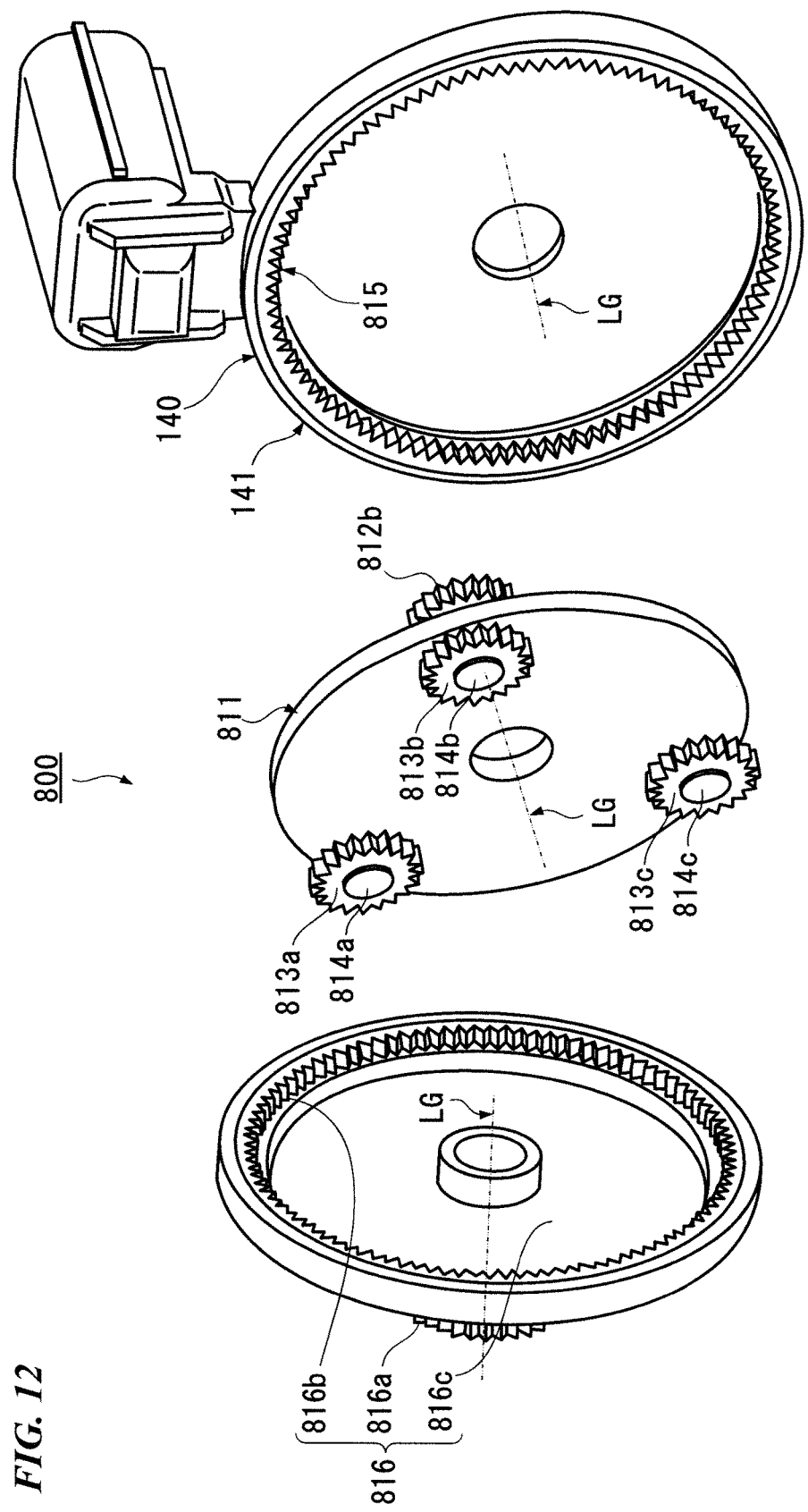
FIG. 12 is an expanded perspective view of the deceleration device of the electric motor equipped with deceleration device according to the second embodiment of the present invention.

In addition, as is shown in FIG. 12, the deceleration device 800 is provided with a circular disk-shaped linking component 811, three first planetary gears 812a, 812b, and 812c that have external teeth, three second planetary gears 813a, 813b, and 813c that have external teeth, three linking shafts 814a, 814b, and 814c that link the first planetary gears 812a, 812b, and 812c to the second planetary gears 813a, 813b, and 813c, a fixed gear 815 that is formed in a toroidal shape and has internal teeth, and an output component 816 that is formed in a toroidal shape. Here, the output component 816 is provided with a linking component 816a that is formed in a toroidal shape, a circular disk-shaped connecting component 816c that is formed integrally with an outer wall of the linking component 816a, and with an output gear 816b that is formed in a toroidal shape and has internal teeth, and that is mounted integrally on the linking component 816c.

The first planetary gears 812a, 812b, and 812c are arranged at identical pitches of 120° intervals on the linking component 811 so as to be concentrically centered on the axis LG of the deceleration device 800. In addition, the first planetary gears 812a, 812b and 812c are supported on the linking component 811 by the linking shafts 814a, 814b, and 814c such that they are freely rotatable. Furthermore, the second planetary gears 813a, 813b, and 813c rotate via the linking shafts 814a, 814b and 814c in synchronization with the first planetary gears 812a, 812b, and 812c. The first planetary gears 812a, 812b, and 812c mesh with the fixed gear 815 that is located concentrically on the axis LG, while the output component 816 is placed concentrically on the axis LG and meshes with the second planetary gears 813a, 813b, and 813c.

Furthermore, as is shown in FIG. 11, the deceleration device 800 is positioned so as to surround the main shaft component 200 between the armature 130 of the electric motor 100 and the other end portion 202 of the main shaft component 200. At this time, the axis LG of the deceleration device 800 and the axis LS of the main shaft component 200 are the same axis, and the fixed gear 815, which is formed in a toroidal shape, and the output component 816 are located on the same axis so as to surround the main shaft component 200. Moreover, the fixed gear 815 is attached to the main body component 141 of the power supply device 140. The fixed gear 815 is fixed to the motor housing 110 via the power supply device 140, and the output component 816 is engaged with the main shaft component 200 such that it is freely rotatable. Namely, the output component 816 is installed such that it is freely rotatable relative to the motor housing 110.

Here, the linking component 811 of the deceleration device 800 is integrally attached to the armature shaft 131 of the electric motor 100, and the linking component 811 rotates in synchronization with the armature 130. The rotation of the armature 130 of the electric motor 100 is decelerated by the deceleration device 800, which is configured in the above-described manner, and a decelerated output is output from the output component 816 of the deceleration device 800.

Third Embodiment

Next, an electric motor equipped with deceleration device 900 according to a third embodiment of the present invention will be described based on FIG. 13 and FIG. 14. Note that the electric motor equipped with deceleration device 900 of the third embodiment differs from the electric motor equipped with deceleration device 1 of the first embodiment mainly in the structure of the deceleration device. Accordingly, hereinafter, the deceleration device will be described, while the remaining portions will be given the same descriptive symbols as above and no description thereof will be given.

Figure 13:
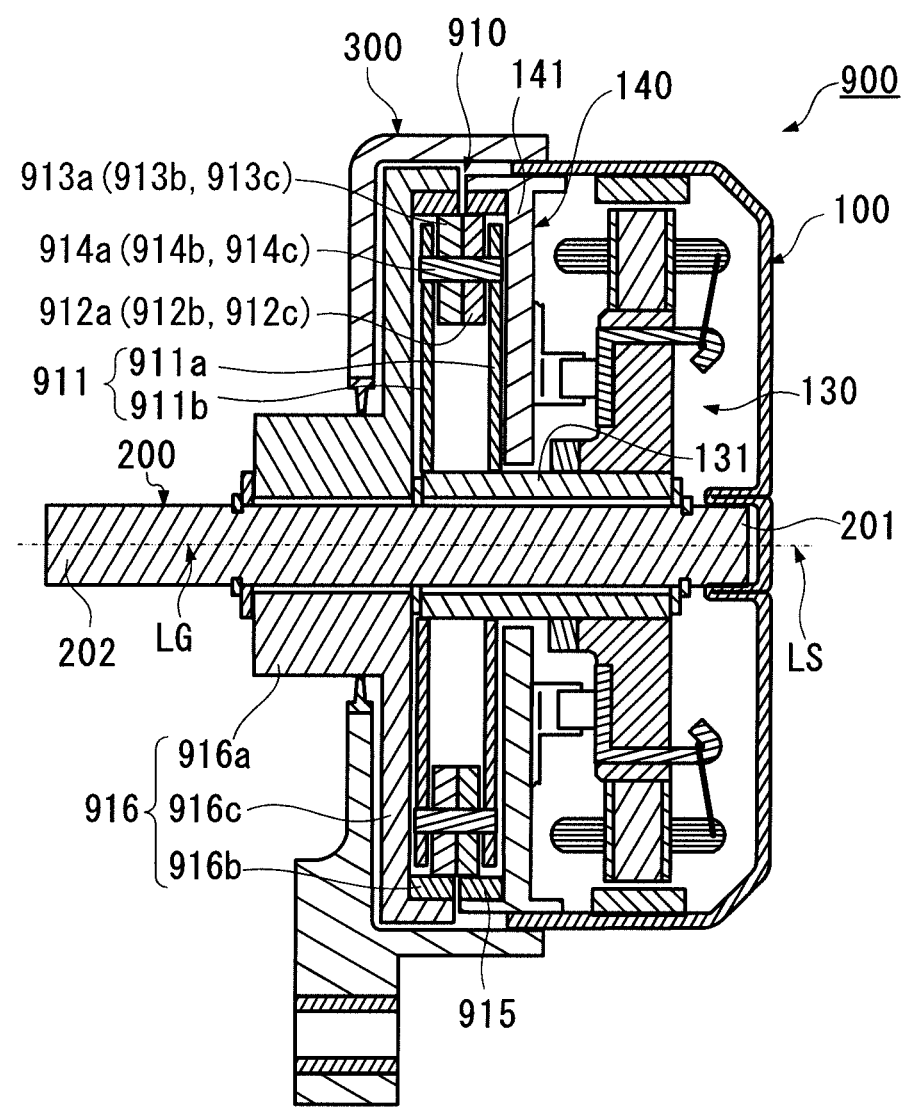
FIG. 13 is a vertical cross-sectional view of an electric motor equipped with deceleration device according to a third embodiment of the present invention.

As is shown in FIG. 13, the electric motor equipped with deceleration device 900 is provided with the electric motor 100, a deceleration device 910, the main shaft component 200, and the case component 300.

Figure 14:
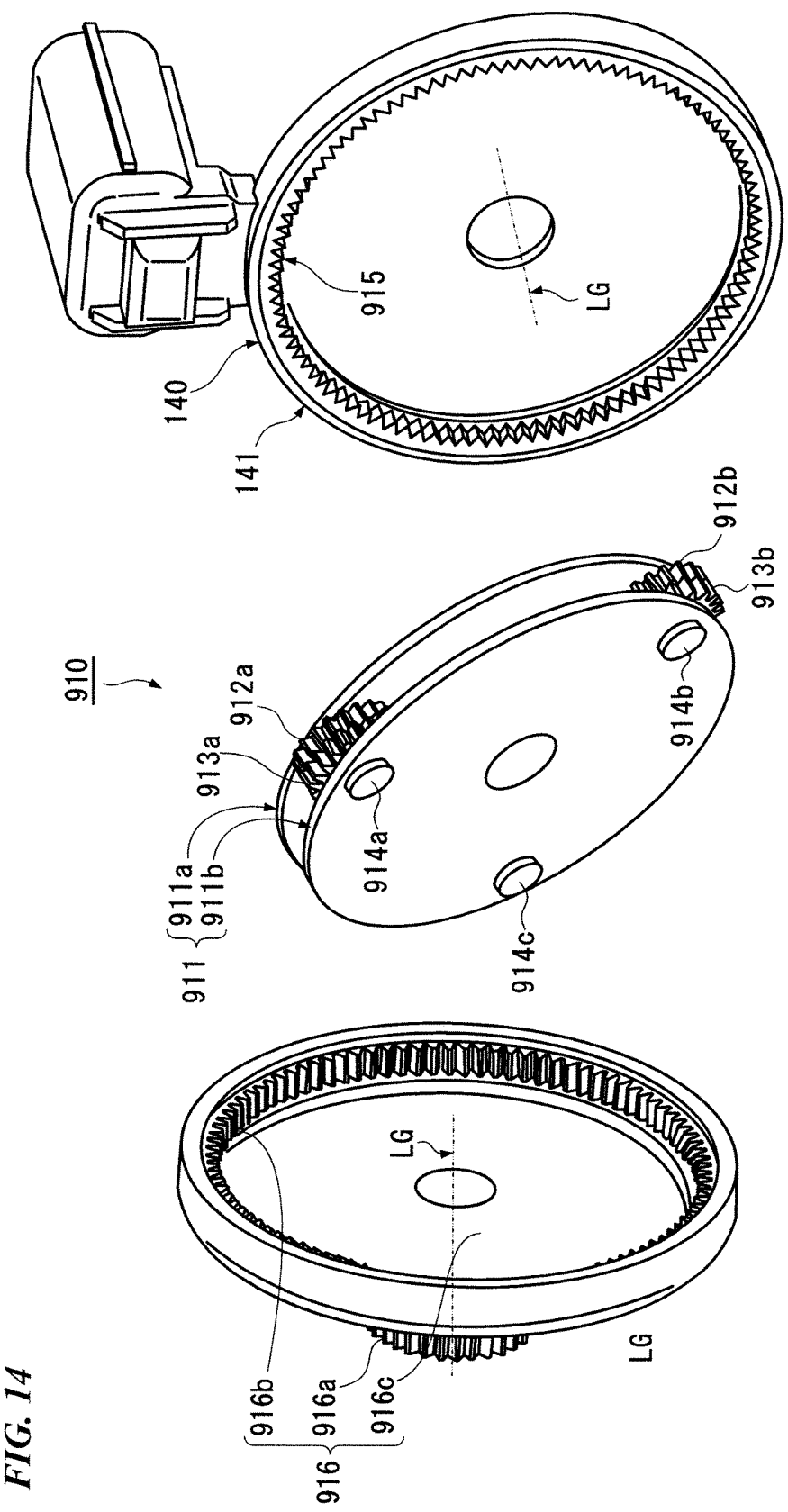
FIG. 14 is an expanded perspective view of the deceleration device of the electric motor equipped with deceleration device according to the third embodiment of the present invention.

In addition, as is shown in FIG. 14, the deceleration device 910 is provided with a linking component 911 that is configured of a first linking component 911a and a second linking component 911b that are formed in substantially the same circular disk shape as each other, three first planetary gears 912a, 912b, and 912c that have external teeth, three second planetary gears 913a, 913b, and 913c that have external teeth, three supporting shafts 914a, 914b, and 914c that support the first planetary gears 912a, 912b, and 912c and the second planetary gears 913a, 913b, and 913c, a fixed gear 915 that is formed in a toroidal shape and has internal teeth, and an output component 916 that is formed in a toroidal shape.

Here, the output component 916 is provided with a linking component 916*a* that is formed in a toroidal shape, a circular disk-shaped connecting component 916*c* that is formed integrally with an outer wall of the linking component 916*a*, and with an output gear 916*b* that has internal teeth that is formed in a toroidal shape and has internal teeth, and that is mounted integrally on the linking component 916*c*.

Moreover, the first linking component 911*a* and the second linking component 911*b* are placed in parallel with each other and at a predetermined distance apart, and are fixed to each other by the supporting shafts 914*a*, 914*b*, and 914*c* that are placed concentrically with each other at identical pitches of 120° intervals.

Here, the first planetary gear 912*a* and the second planetary gear 913*a*, the first planetary gear 912*b* and the second planetary gear 913*b*, and the first planetary gear 912*c* and the second planetary gear 913*c*, which mutually correspond to each other, are fixed in position by being bonded together such that they face each other and are centered on the same circle. The second planetary gears 913*a*, 913*b*, and 913*c* rotate in synchronization with the first planetary gears 912*a*, 912*b*, and 912*c*.

In addition, the first planetary gear 912*a* and the second planetary gear 913*a*, the first planetary gear 912*b* and the second planetary gear 913*b*, and the first planetary gear 912*c* and the second planetary gear 913*c*, which mutually correspond to each other, are positioned between the first linking component 911*a* and the second linking component 911*b*, and are supported by the supporting shafts 914*a*, 914*b*, and 914*c* such that they are freely rotatable. Because of this, the second planetary gears 913*a*, 913*b*, and 913*c* that are bonded to the first planetary gears 912*a*, 912*b*, and 912*c* rotate in synchronization with the first planetary gears 912*a*, 912*b*, and 912*c*. In addition, the first planetary gear 912*a* and the second planetary gear 913*a*, the first planetary gear 912*b* and the second planetary gear 913*b*, and the first planetary gear 912*c* and the second planetary gear 913*c*, which, as is described above, mutually correspond to each other, are axially supported such that they are freely rotatable in the linking component 911.

Moreover, the first planetary gears 912*a*, 912*b*, and 912*c* also mesh with the fixed gear 915 that is placed concentrically on the axis LG, while the output component 916 is placed concentrically on the axis LG and meshes with the second planetary gears 913*a*, 913*b*, and 913*c*.

Furthermore, as is shown in FIG. 13, the deceleration device 910 is positioned so as to surround the main shaft component 200 between the armature 130 of the electric motor 100 and the other end portion 202 of the main shaft component 200. At this time, the axis LG of the deceleration device 910 and the axis LS of the main shaft component 200 are the same axis, and the fixed gear 915, which is formed in a toroidal shape, and the output component 916 are located on the same axis so as to surround the main shaft component 200. Moreover, the fixed gear 915 is attached to the main body component 141 of the power supply device 140. The fixed gear 915 is fixed to the motor housing 110 via the power supply device 140, and the output component 916 is engaged with the main shaft component 200 such that it is freely rotatable. Namely, the output component 916 is installed such that it is freely rotatable relative to the motor housing 110.

Here, the linking component 911 of the deceleration device 910 is integrally attached to the armature shaft 131 of the electric motor 100, and the linking component 911 rotates in synchronization with the armature 130. The rotation of the armature 130 of the electric motor 100 is decelerated by the deceleration device 910, which is configured in the above-described manner, and a decelerated output is output from the output component 916 of the deceleration device 910.

Fourth Embodiment

Next, an electric motor equipped with deceleration device 1000 according to a fourth embodiment of the present invention will be described based on FIG. 15 and FIG. 16. Note that the electric motor equipped with deceleration device 1000 of the fourth embodiment differs from the electric motor equipped with deceleration device 1 of the first embodiment mainly in the structure of the deceleration device. Accordingly, hereinafter, the deceleration device will be described, while the remaining portions will be given the same descriptive symbols as above and no explanation thereof will be given.

Figure 15:
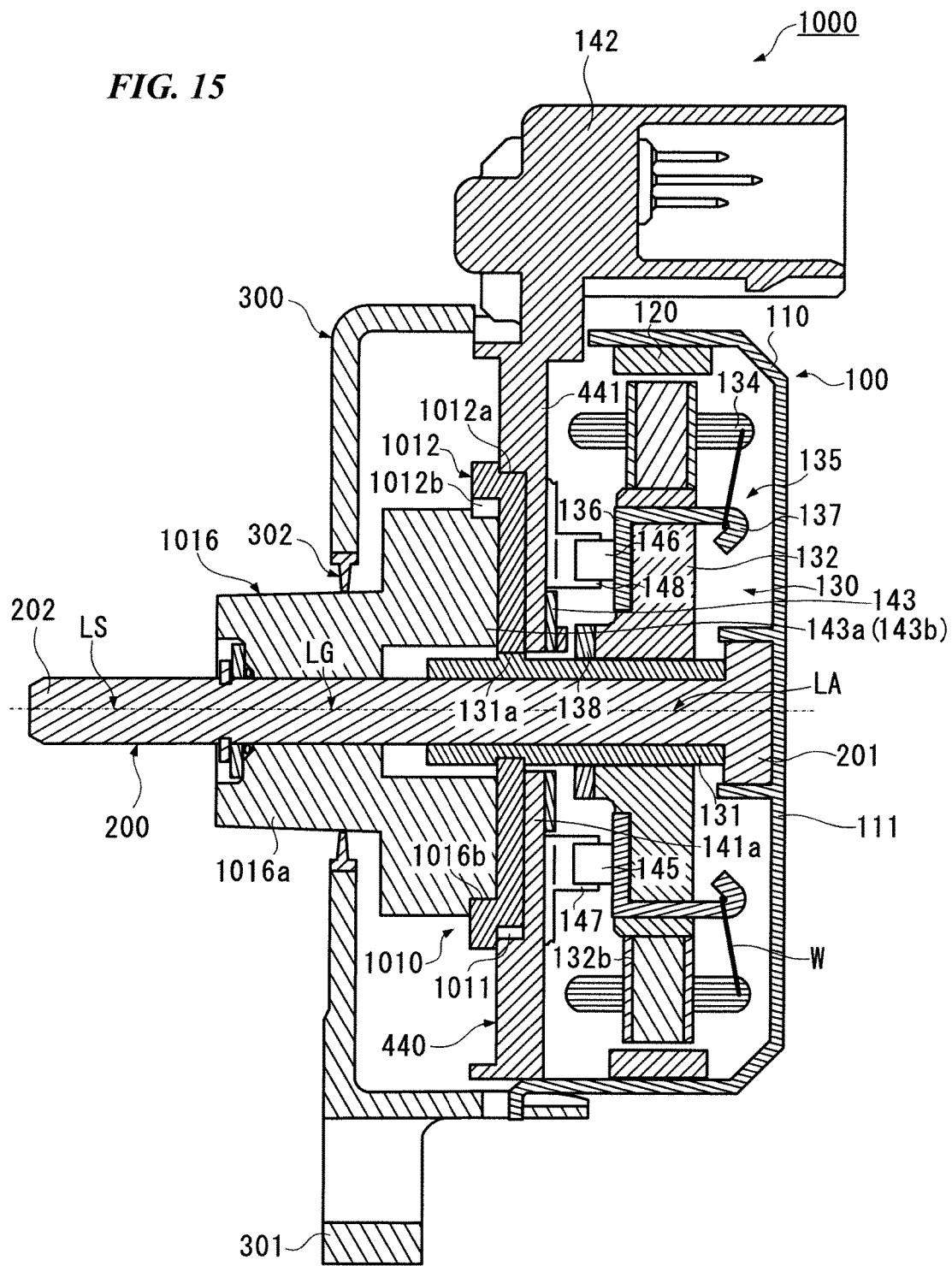
FIG. 15 is a vertical cross-sectional view of an electric motor equipped with deceleration device according to a fourth embodiment of the present invention.

As is shown in FIG. 15, the electric motor equipped with deceleration device 1000 is provided with the electric motor 100, a deceleration device 1010, the main shaft component 200, and the case component 300.

Figure 16:
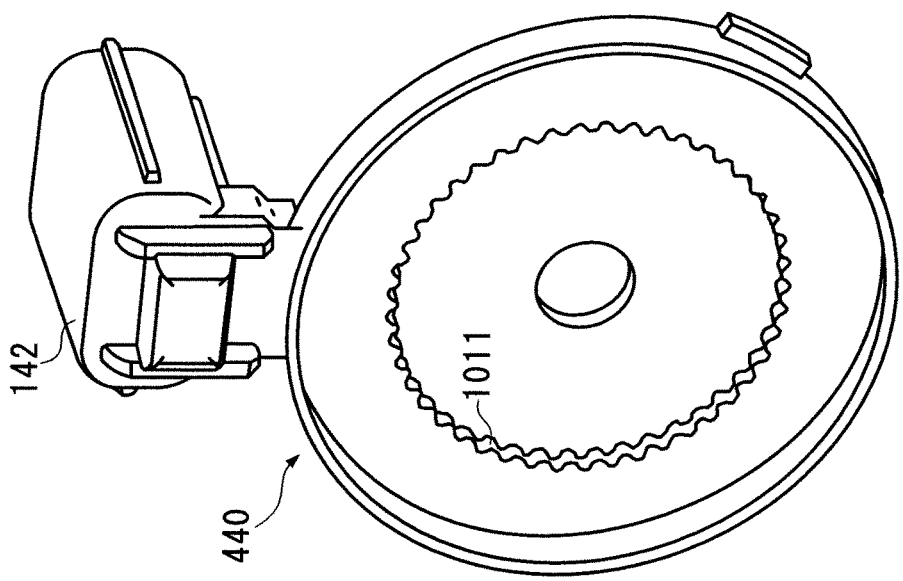
FIG. 16 is an expanded perspective view of the deceleration device of the electric motor equipped with deceleration device according to the fourth embodiment of the present invention.
Figure 16:
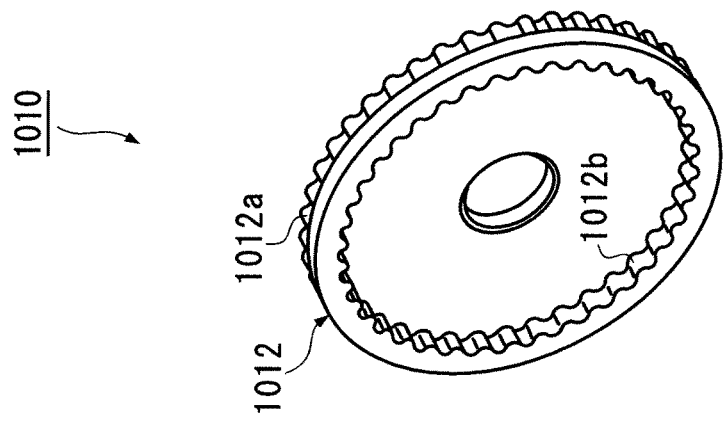
Figure 16:
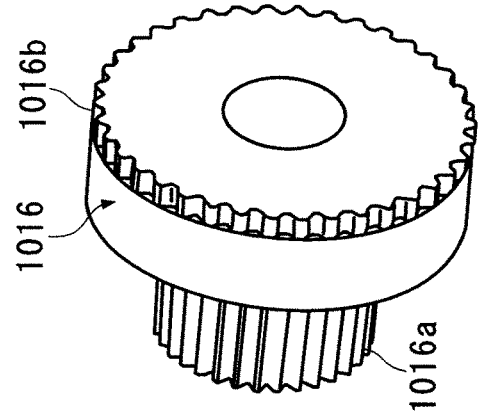

In addition, as is shown in FIG. 15 and FIG. 16, the deceleration device 1010 is provided with a fixed internal gear 1011, a swing gear 1012, and an output component 1016. The fixed internal gear 1011 is provided integrally with a main body component 441 of a power supply device 440. Moreover, an output gear 1016*b* is provided on the output component 1016.

The swing gear 1012 is axially supported such that it is freely rotatable on an eccentric component 131*a* that is positioned eccentrically relative to the armature shaft 131. An external gear 1012*a* and an internal gear 1012*b* are provided on the swing gear 1012. The external gear 1012*a* is positioned such that it is capable of meshing with the fixed internal gear 1011 and rolling around inside this gear, while the internal gear 1012*b* is positioned such that it is capable of meshing with the output gear 1016*b* and rolling around this gear.

A linking component 1016*a* is provided on the output component 1016 and, in the same way as in the first embodiment, the drum wheel 500 is mounted on this linking component 1016*a*.

As is shown in FIG. 15, the deceleration device 1010 is positioned so as to surround the main shaft component 200 between the armature 130 of the electric motor 100 and the other end portion 202 of the main shaft component 200. At this time, the axis LG of the deceleration device 1010 and the axis LS of the main shaft component 200 are the same axis, and the fixed internal gear 1011, which is formed in a toroidal shape, and the output component 1016 are located on the same axis so as to surround the main shaft component 200. Moreover, the fixed internal gear 1011 is attached to the main body component 441 of the power supply device 440. The fixed internal gear 1011 is fixed to the motor housing 110 via the power supply device 440, and the output component 1016 is engaged with the main shaft component 200 such that it is freely rotatable. Namely, the output component 1016 is installed such that it is freely rotatable relative to the motor housing 110.

Here, the swinging component 1012 of the deceleration device 1010 is attached to the armature shaft 131 of the electric motor 100 such that it is freely rotatable, and the swinging component 1012 performs a swinging motion in accompaniment to the rotation of the armature 100. The rotation of the armature 100 of the electric motor 100 is decelerated by the deceleration device 1010, which is configured in the above-described manner, and a decelerated output is output from the output component 1016 of the deceleration device 1010.

Fifth Embodiment

Next, an electric motor equipped with deceleration device 1100 according to a fifth embodiment of the present invention will be described based on FIG. 17 and FIG. 18. Note that the electric motor equipped with deceleration device 1100 of the fifth embodiment differs from the electric motor equipped with deceleration device 1 of the first embodiment mainly in the structure of the deceleration device. Accordingly, hereinafter, the deceleration device will be described, while the remaining portions will be given the same descriptive symbols as above and no explanation thereof will be given.

Figure 17:
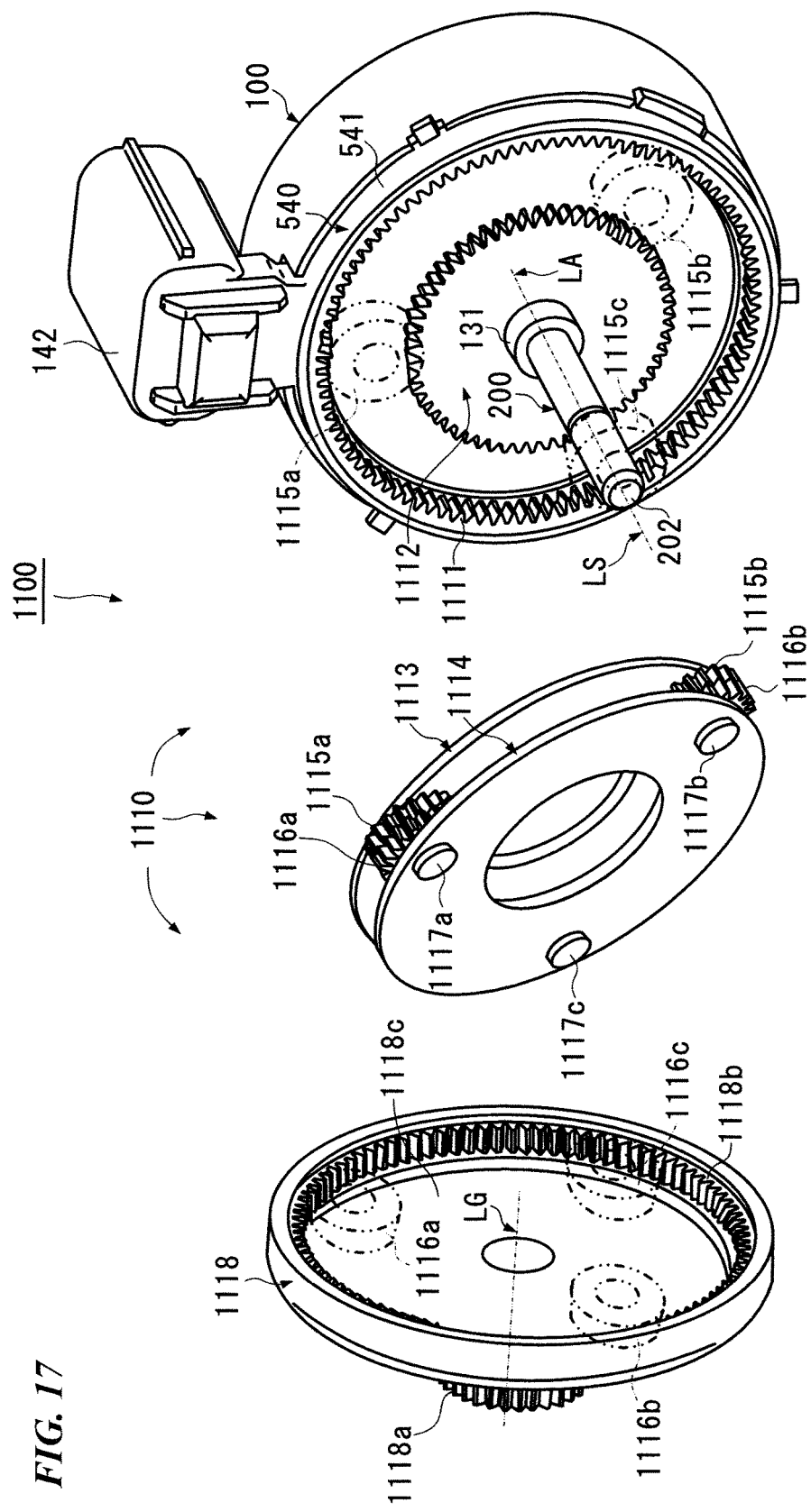
FIG. 17 is an expanded perspective view of a deceleration device of an electric motor equipped with deceleration device according to a fifth embodiment of the present invention.

As is shown in FIG. 17, the electric motor equipped with deceleration device 1100 is provided with the electric motor 100, a deceleration device 1110, and the main shaft component 200.

Figure 18:
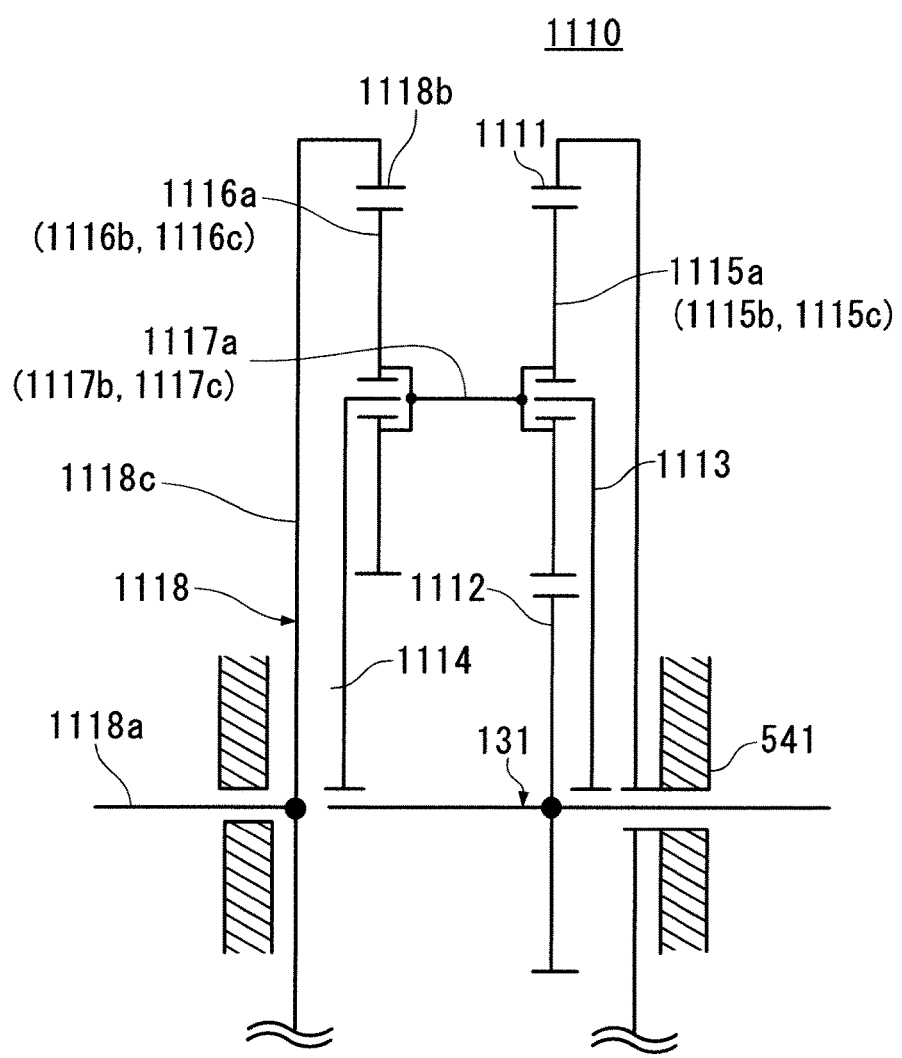
FIG. 18 is a simplified structural view of a deceleration device of an electric motor equipped with deceleration device according to a sixth embodiment of the present invention.

In addition, as is shown in FIG. 17 and FIG. 18, the deceleration device 1110 is provided with a fixed internal gear 1111, an external gear 1112, linking components 1113 and 1114, first planetary gears 1115a, 1115b, and 1115c, second planetary gears 1116a, 1116b, and 1116c, linking shafts 1117a, 1117b, and 1117c, and an output component 1118. Here, a toroidal output gear 1118b is provided on the output component 1118.

The fixed internal gear 1111 is formed in a toroidal shape and is fixed to a main body component 541 of a power supply device 540. The external gear 1112 is formed in a circular disk shape and is mounted on the armature shaft 131. The linking shafts 1117a, 1117b, and 1117c are attached to the linking components 1113 and 1114 that are each formed in a toroidal shape, and the linking components 1113 and 1114 are held in parallel with each other by the linking shafts 1117a, 1117b, and 1117c. The first planetary gear 1115a and the second planetary gear 1116a are provided on the linking shaft 1117a. In the same way, the first planetary gear 1115b and the second planetary gear 1116b are provided on the linking shaft 1117b, and the first planetary gear 1115c and the second planetary gear 1116c are provided on the linking shaft 1117c. Here, the first planetary gear 1115a and the second planetary gear 1116a are set such that they are capable of rotating in synchronization with each other. In the same way, the first planetary gear 1115b and the second planetary gear 1116b, and the first planetary gear 1115c and the second planetary gear 1116c are also set respectively such that they are capable of rotating in synchronization with each other.

The first planetary gears 1115a, 1115b, and 1115c are located between the fixed internal gear 1111 and the external gear 1112, and are set such that they mesh with the fixed internal gear 1111 and the external gear 1112. The second planetary gears 1116a, 1116b, and 1116c are set such that they mesh with the output gear 1118b.

In addition, the deceleration device 1110 is positioned so as to surround the main shaft component 200 between the armature 130 of the electric motor 100 and the other end portion 202 of the main shaft component 200. At this time, the axis LG of the deceleration device 1110 and the axis LS of the main shaft component 200 are the same axis, and the fixed internal gear 1111, which is formed in a toroidal shape, and the output component 1118 are located on the same axis so as to surround the main shaft component 200. Moreover, the fixed internal gear 1111 is attached to the main body component 541 of the power supply device 540. The fixed internal gear 1111 is fixed to the motor housing 110 via the power supply device 540, and the output component 1118 is engaged with the main shaft component 200 such that it freely rotatable. Namely, the output component 1118 is installed such that it is freely rotatable relative to the motor housing 110.

Here, the external gear 1112 of the deceleration device 1110 is integrally attached to the armature shaft 131 of the electric motor 100, and the external gear 1112 rotates in synchronization with the armature 130. The rotation of the armature 130 of the electric motor 100 is decelerated by the deceleration device 1110, which is configured in the above-described manner, and a decelerated output is output from the output component 1118 of the deceleration device 1110. Note that a linking component 1116a is provided on the output component 1118, and, in the same way as the first embodiment, the drum wheel 500 is mounted on this linking component 1116a.

Sixth Embodiment

Next, an electric motor equipped with deceleration device 1200 according to a sixth embodiment of the present invention will be described based on FIG. 19 through FIG. 22. Note that the electric motor equipped with deceleration device 1200 of the sixth embodiment differs from the electric motor equipped with deceleration device 1 of the first embodiment mainly in the structure of the deceleration device. Accordingly, hereinafter, the deceleration device will be described, while the remaining portions will be given the same descriptive symbols as above and no explanation thereof will be given.

Figure 19:
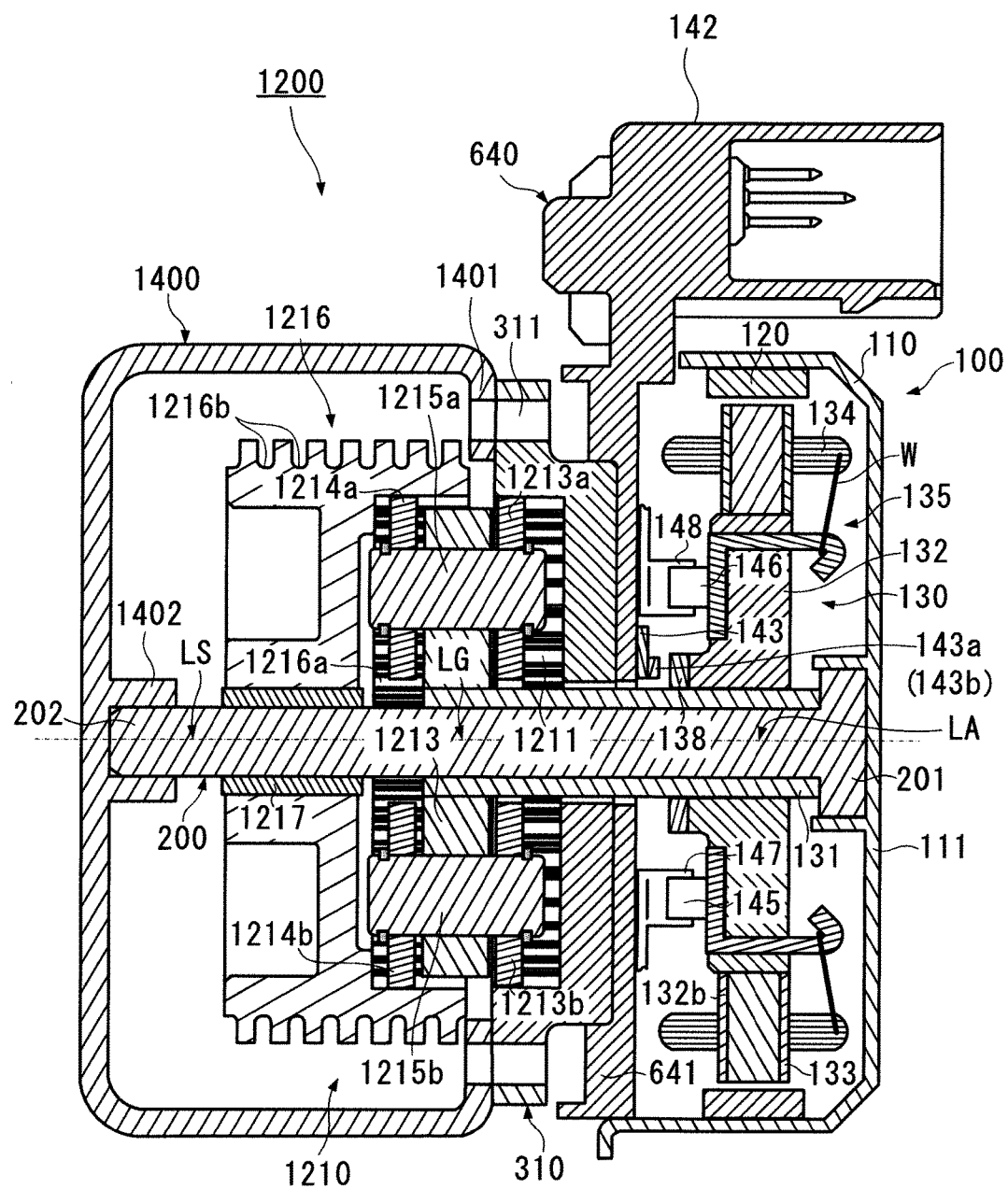
FIG. 19 is a vertical cross-sectional view of the electric motor equipped with deceleration device according to the sixth embodiment of the present invention.
Figure 20:
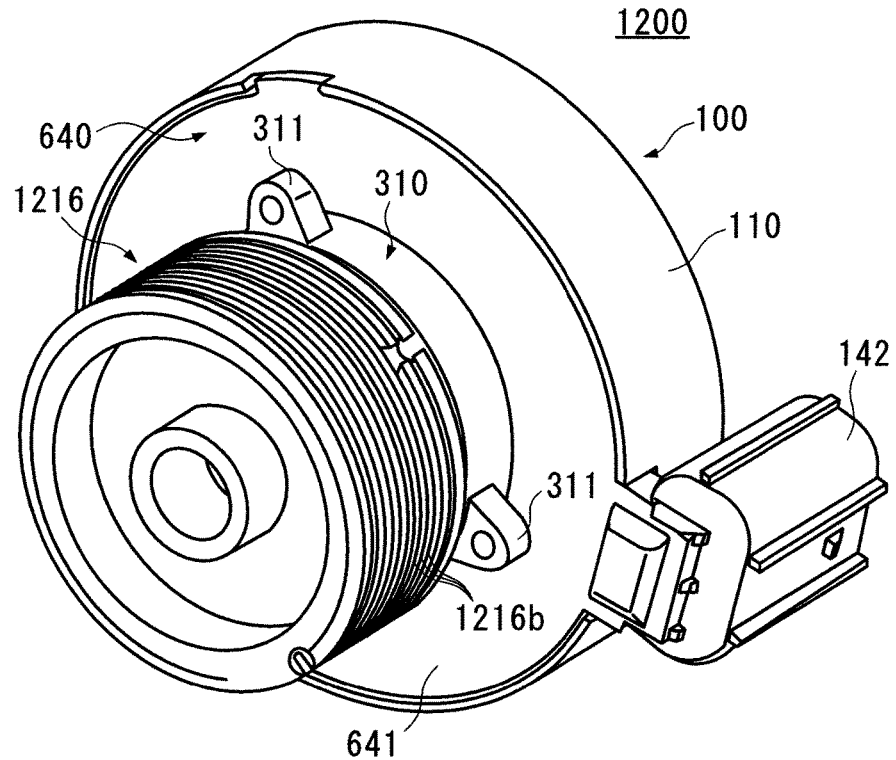
FIG. 20 is a perspective view of the electric motor equipped with deceleration device according to the sixth embodiment of the present invention.

As is shown in FIG. 19, the electric motor equipped with deceleration device 1200 is provided with the electric motor 100, a deceleration device 1210, the main shaft component 200, and the case component 310.

Figure 21:
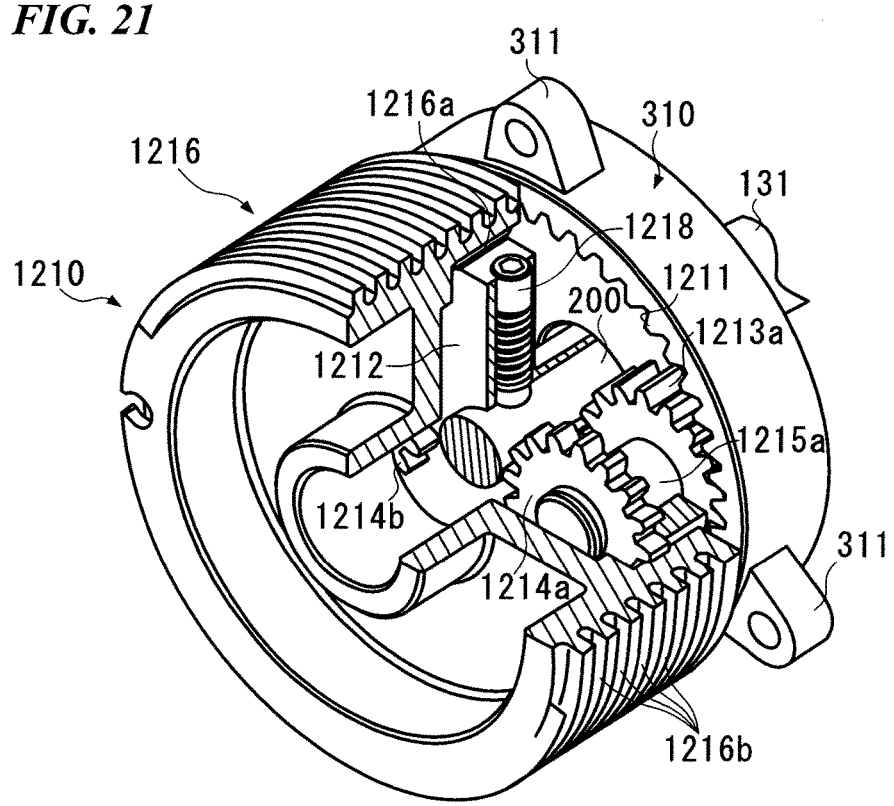
FIG. 21 is a perspective view showing a partial cross-section of the deceleration device of the electric motor equipped with deceleration device according to the sixth embodiment of the present invention.
Figure 22:
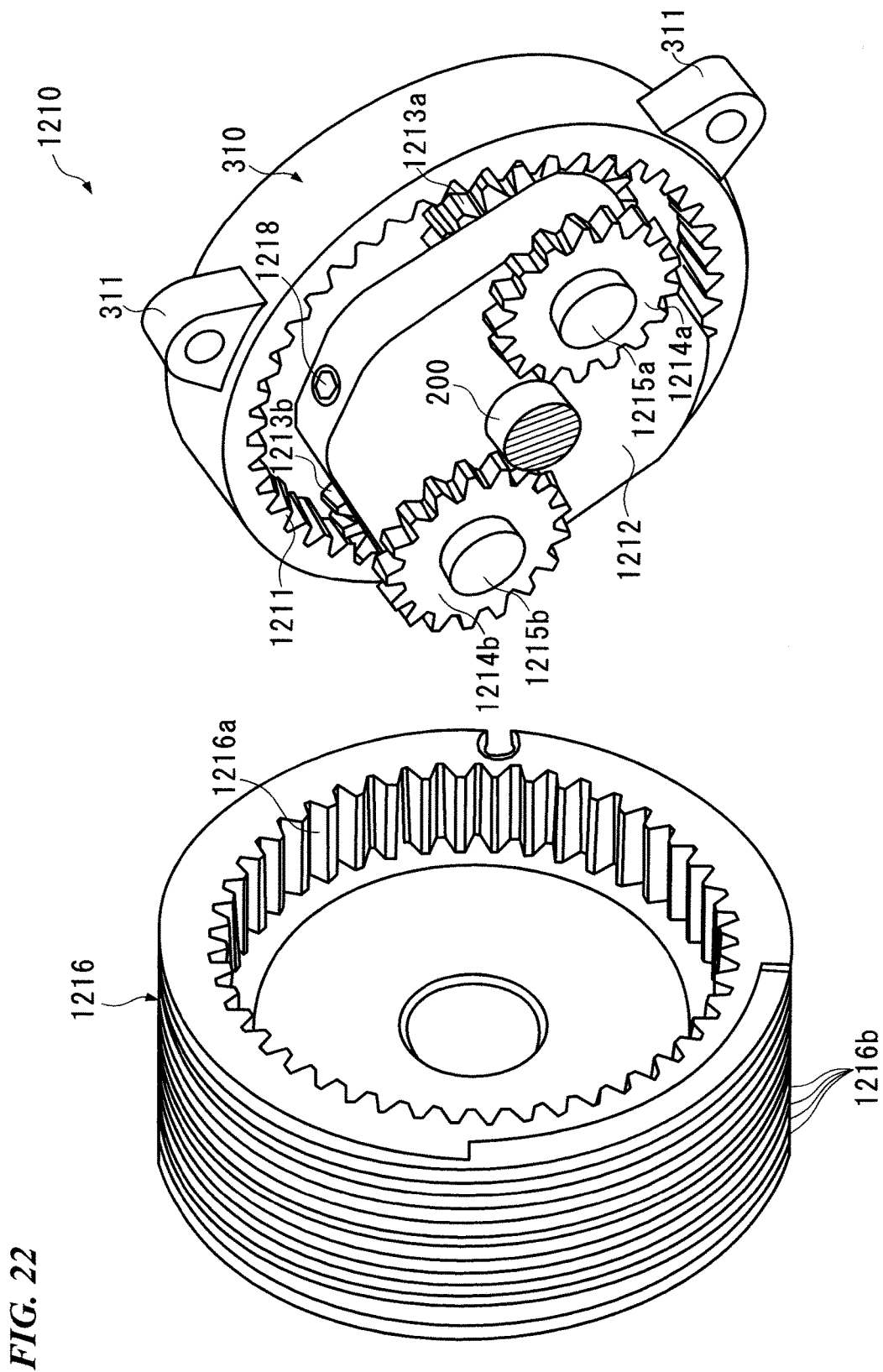
FIG. 22 is an expanded perspective view of the deceleration device of the electric motor equipped with deceleration device according to the sixth embodiment of the present invention.

In addition, as is shown in FIG. 21 and FIG. 22, the deceleration device 1210 is provided with a fixed internal gear 1211, a linking component 1212, first planetary gears 1213a and 1213b, second planetary gears 1214a and 1214b, linking shafts 1215a and 1215b, and an output component (i.e., a drum wheel) 1216. A toroidal output gear 1216a is formed integrally with an internal wall of the drum wheel 1216.

The fixed internal gear 1211 is formed integrally with the case component 310. In addition, the case component 310 is fixed to a main body component 641 of a power supply device 640. The linking component 1212 is formed in a disk shape, and is attached to the armature shaft 131. The linking shafts 1215a and 1215b are attached to the linking component 1212. The first planetary gear 1213a and the second planetary gear 1214a are provided on the linking shaft 1215a. In the same way, the first planetary gear 1213b and the second planetary gear 1214b are provided on the linking shaft 1117b. Here, the first planetary gear 1213a and the second planetary gear 1214a are set such that they are capable of rotating in synchronization with each other. In the same way, the first planetary gear 1213b and the second planetary gear 1214b are also set respectively such that they are capable of rotating in synchronization with each other.

The first planetary gears 1213a and 1213b are set such that they mesh with the fixed internal gear 1211, while the second planetary gears 1214a and 1214b are set such that they mesh with the output gear 1216a.

In addition, the deceleration device 1210 is positioned so as to surround the main shaft component 200 between the armature 130 of the electric motor 100 and the other end portion 202 of the main shaft component 200. At this time, the axis LG of the deceleration device 1210 and the axis LS of the main shaft component 200 are the same axis, and the fixed internal gear 1211, which is formed in a toroidal shape, and the output component (i.e., the drum wheel) 1216 are located on the same axis so as to surround the main shaft component 200. Moreover, the fixed internal gear 1211 is attached via the case component 310 to the main body component 641 of the power supply device 640. Accordingly, the fixed internal gear 1211 is fixed to the motor housing 110 via the case component 310 and the power supply device 640, and the output component (i.e., the drum wheel) 1216 is engaged with the main shaft component 200 such that it is freely rotatable. Namely, the drum wheel 1216 is installed such that it is freely rotatable relative to the motor housing 110.

Next, the mounting of the electric motor equipped with deceleration device 1200 onto a power window system will be described based on FIG. 19.

The electric motor equipped with deceleration device 1200 is mounted on a motor bracket 1400 that is provided in a power window system. This mounting is achieved by bringing a mounting portion 311 that is provided on the case component 310 of the electric motor 1200 into contact with a mounting portion 1401 of the motor bracket 1400, and by fastening the mounting portion 1401 to the mounting portion 311 with fastening components.

During the mounting of the electric motor 1200 onto the motor bracket 1400, the other end portion 202 of the main shaft component 200 of the electric motor 1200 is rotatably supported by a holding portion 1402 of the motor bracket 1400. Moreover, the drum wheel 1216 around which wire is wound is provided on the actual deceleration device 1210 itself. Because of this, the drum wheel 1216 itself also rotates in synchronization with the operation of the deceleration device 1210. Here, the wire that is wound around the drum wheel 1216 is an operating device that enables the power window system to operate, and the power window system is operated via the wire as a result of the electric motor equipped with deceleration device 1200 being operated.

Seventh Embodiment

Next, an electric motor equipped with deceleration device 1300 according to a seventh embodiment of the present invention will be described based on FIG. 23. Note that the electric motor equipped with deceleration device 1300 of the seventh embodiment differs from the electric motor equipped with deceleration device 1200 of the sixth mainly in the structure of the deceleration device. Accordingly, hereinafter, the deceleration device will be described, while the remaining portions will be given the same descriptive symbols as above and no explanation thereof will be given.

Figure 23:
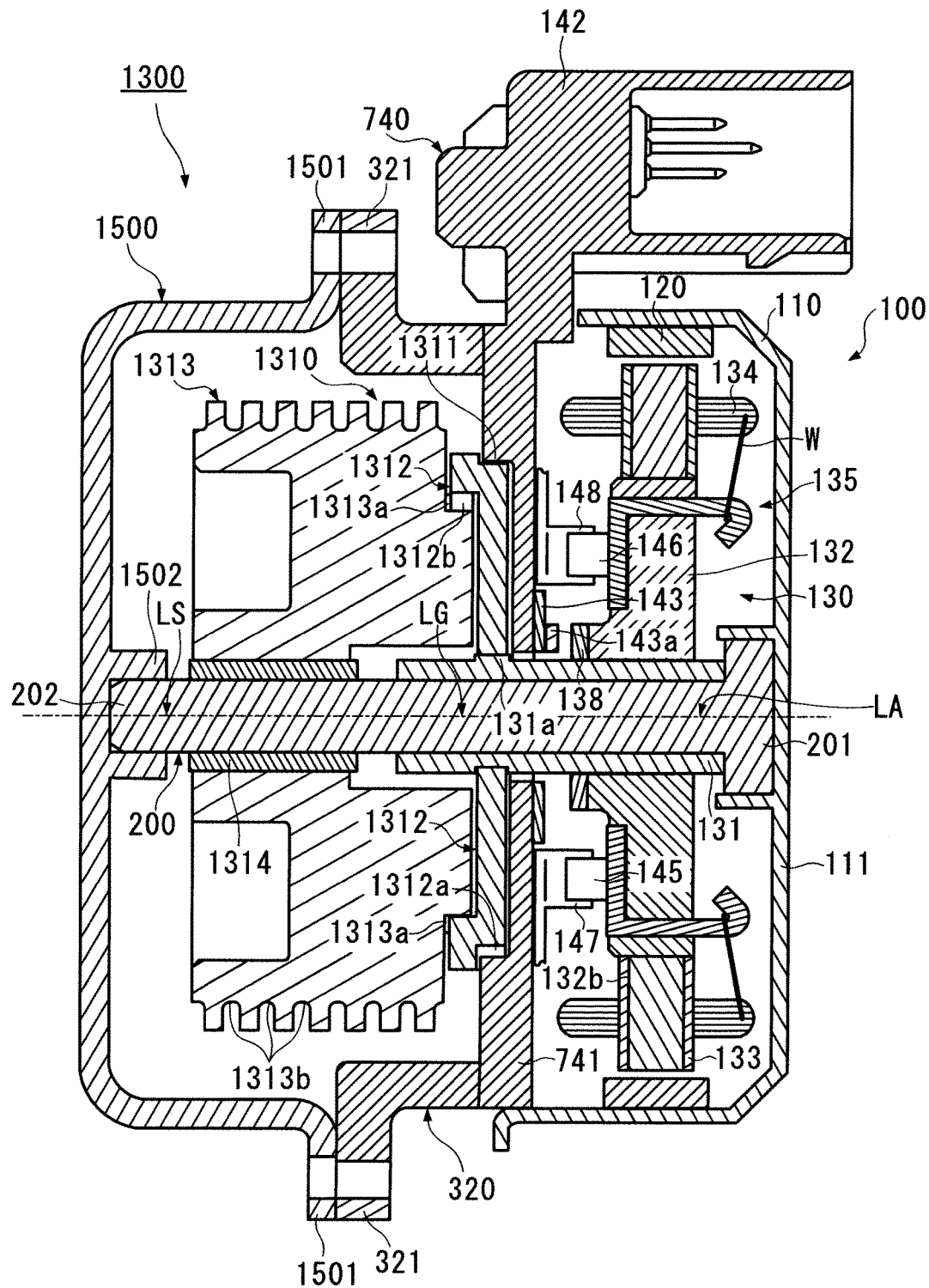
FIG. 23 is a vertical cross-sectional view of an electric motor equipped with deceleration device according to a seventh embodiment of the present invention.

As is shown in FIG. 23, the electric motor equipped with deceleration device 1300 is provided with the electric motor 100, a deceleration device 1310, the main shaft component 200, and a case component 320.

In addition, as is shown in FIG. 23, the deceleration device 1310 is provided with a fixed internal gear 1311, a swing gear 1312, and an output component (i.e., a drum wheel) 1313. The fixed internal gear 1311 is provided integrally with a main body component 741 of a power supply device 740. Moreover, an output gear 1313a is provided on the output component 1313.

The swing gear 1312 is axially supported such that it is freely rotatable on the eccentric component 131a that is positioned eccentrically relative to the armature shaft 131. An external gear 1312a and an internal gear 1312b are provided on the swing gear 1312. The external gear 1312a is positioned such that it is capable of meshing with the fixed internal gear 1311 and rolling around inside this gear, while the internal gear 1312b is positioned such that it is capable of meshing with the output gear 1313a and rolling around this gear.

As is shown in FIG. 23, the deceleration device 1310 is positioned so as to surround the main shaft component 200 between the armature 130 of the electric motor 100 and the other end portion 202 of the main shaft component 200. At this time, the axis LG of the deceleration device 1310 and the axis LS of the main shaft component 200 are the same axis, and the fixed internal gear 1311, which is formed in a toroidal shape, and the output component 1313 are located on the same axis so as to surround the main shaft component 200. Moreover, the fixed internal gear 1311 is attached to the main body component 741 of the power supply device 740. Accordingly, the fixed internal gear 1311 is fixed to the motor housing 110 via the power supply device 740, and the output component 1313 is engaged with the main shaft component 200 such that it is freely rotatable. Namely, the output component (i.e., the drum wheel) 1313 is installed such that it is freely rotatable relative to the motor housing 110.

Next, the mounting of the electric motor equipped with deceleration device 1300 onto a power window system will be described based on FIG. 23.

The electric motor equipped with deceleration device 1300 is mounted on a motor bracket 1500 that is provided in a power window system. This mounting is achieved by bringing a mounting portion 321 that is provided on the case component 320 of the electric motor 1300 into contact with a mounting portion 1501 of the motor bracket 1500, and by fastening the mounting portion 1501 to the mounting portion 321 with fastening components.

During the mounting of the electric motor 1300 onto the motor bracket 1500, the other end portion 202 of the main shaft component 200 of the electric motor 1300 is rotatably supported by a holding portion 1502 of the motor bracket 1500. Moreover, the drum wheel 1313 around which wire is wound is provided on the actual deceleration device 1310 itself. Because of this, the drum wheel 1316 itself also rotates in conjunction with the operation of the deceleration device 1310. Here, the wire that is wound around the drum wheel 1316 is an operating device that enables the power window system to operate, and the power window system is operated via the wire as a result of the electric motor equipped with deceleration device 1300 being operated.

INDUSTRIAL APPLICABILITY

According to the above-described electric motors equipped with deceleration devices, it is possible to provide an electric motor equipped with a small-sized deceleration device in which the electric motor does not protrude in a radial direction from the output component of the deceleration device. [Reference Signs List]

1, 700, 900, 1000, 1100, 1200, 1300 . . . Electric motor equipped with deceleration device 10, 800, 910, 1010, 1110, 1210, 1310 . . . Deceleration device
11, 811, 911, (911a, 911b), 1113, 1114 . . . Linking component
12a, 12b, 12c, 812a, 812b, 812c, 912a, 912b, 912c, 1115a, 1115b, 1115c, 1213a, 1213b . . . First planetary gear
13a, 13b, 13c, 813a, 813b, 813c, 913a, 913b, 913c, 1116a, 1116b, 1116c, 1214a, 1214b . . . Second planetary gear
14a, 14b, 14c, 814a, 814b, 814c, 914a, 914b, 914c, 1117a, 1117b, 1117c, 1215a, 1215b . . . Linking shaft
15, 815, 915, 1011, 1111, 1211, 1311 . . . Fixed gear
16, 816, 916, 1016, 1118 . . . Output component
1216, 1313 . . . Output component (Drum wheel)
16a, 816a, 916a, 1016a, 1118a . . . Linking component
16b, 816b, 916b, 1016b, 1118b, 1216a, 1313a . . . Output gear
100 . . . Electric motor
110 . . . Motor housing
111 . . . Bottom portion
120 . . . Motor magnet
130 . . . Armature
131 . . . Armature shaft
132 . . . Armature core
132a . . . Teeth
133 . . . Insulator
134 . . . Coil
135 . . . Commutator
136 . . . Commutator piece
137 . . . Hooking portion
138 . . . Ring magnet
140 . . . Power supply device
141 . . . Main body component
141a . . . Facing surface
142 . . . Connector
143 . . . Control substrate
143a . . . Sensor element (Hall IC)
143b . . . Sensor element (Hall IC)
144 . . . Current control element (PTC element)
145 . . . Brush
146 . . . Brush
147 . . . Spring component
147a . . . Displacement portion
147b . . . Fixed portion
148 . . . Spring component
148a . . . Displacement portion
148b . . . Fixed portion
200 . . . Main shaft component
201 . . . One end portion
202 . . . Other end portion
300, 310, 320 . . . Case component
300a . . . Bottom portion
301, 311, 321 . . . Mounting portion
302 . . . Sealing component
400, 1400, 1500 . . . Motor bracket
401 . . . Mounting portion
402 . . . Holding portion
500 . . . Drum wheel
600 . . . Wire
914a, 914b, 914c . . . Supporting shaft
LG, LS, LA . . . Axis
W . . . Magnet wire
B . . . Bus bar

What is claimed is:

1. An electric motor equipped with deceleration device comprising:
an electric motor comprising: a motor housing which is in the shape of a circular cylinder having a bottom portion, motor magnets that are disposed on an internal wall of the motor housing, an armature that is rotatably disposed on an inner side of the motor magnets inside the motor housing, and a power supply device that has brushes and is configured to supply current to the armature;
a deceleration device having an output component that decelerates and then outputs a rotation of the armature of the electric motor; and
a main shaft component that is formed substantially in a circular rod shape, and has one end portion that is fixed to a substantial center of the bottom portion of the motor housing and another end portion that protrudes towards an outer side through an aperture in the motor housing, and the main shaft component being fixed to the motor housing with the one end portion, wherein
the armature is disposed inside the motor housing so as to be on the same axis as the main shaft component and so as to surround the main shaft component,
the deceleration device is disposed between the armature and the other end portion of the main shaft component so as to surround the main shaft component, and the output component, which is formed in a toroidal shape, is disposed on the same axis as the main shaft component so as to surround the main shaft component,
the one end portion of the main shaft component is covered with the bottom portion of the motor housing,
the deceleration device is provided with a fixed gear that is fixed to the motor housing on the same axis as the main shaft component,
the fixed gear is attached to a main body component that is formed between the armature and the deceleration device,
the armature is provided with an armature shaft, an armature core that is fixed to an outer circumferential surface of the armature shaft by being fitted around the outside thereof, insulators that are disposed on both end surfaces of the armature core, coils, and a commutator,
a plurality of teeth that are disposed at the same pitch from each other are formed on the armature core,
the coils are formed by winding in tightly concentrated winds onto the plurality of teeth from an outside of the insulators,
a fixing portion of the motor housing in which the one end portion of the main shaft component is fixed, is folded,
the main shaft component is fixedly arranged directly only at one position of the one end portion of the main shaft component,
the deceleration device includes a fixed internal gear and a swing gear,
an output gear is provided on the output component,
the swing gear is axially supported so as to be freely rotatable on an eccentric component that is positioned eccentrically relative to the armature shaft,
an external gear and an internal gear are provided on the swing gear, and
the external gear is positioned so as to be capable of meshing with the fixed internal gear and rolling around inside the fixed internal gear, while the internal gear is positioned so as to be capable of meshing with the output gear and rolling around the output gear.

2. The electric motor equipped with deceleration device according to claim 1, wherein
the other end portion of the main shaft component is supported by a motor bracket on which the electric motor equipped with deceleration device is mounted, and a drum wheel around which a wire that operates a power window system is wound, and that rotates in synchronization with the output component is linked to the output component.

3. The electric motor equipped with deceleration device according to claim 1, wherein:
the armature is provided with a commutator having a plurality of commutator pieces that are arranged at the same pitch from each other in a radiating pattern so as to extend in orthogonal directions relative to an axis of the armature, and over which the brushes are capable of sliding,
hooking portions are formed integrally with an outer circumferential portion on an outer side in a radial direction of the plurality of commutator pieces, and
the armature is provided with a structure which the hooking portions of the commutator to which a magnet wire that forms the coils is connected protrude on an opposite side of the armature core from a side where the plurality of communicator pieces are located.

4. The electric motor equipped with deceleration device according to claim 3, wherein
the power supply device includes: the plate-shaped main body component that is made from a resin material, and spring components that are formed by conductive, elastic components, and are attached to a facing surface of the main body component that faces the commutator pieces, and that is capable of energizing the current that is supplied to the power supply device, and wherein
the brushes are electrically and mechanically connected to a displacement portion of the spring components.

5. The electric motor equipped with deceleration device according to claim 1, wherein
the other end portion of the main shaft component is rotatably supported by a motor bracket on which the electric motor equipped with deceleration device is mounted, and
the output component is formed integrally with a drum wheel around which a wire that operates a power window system is wound, and that rotates in synchronization with the output component.

6. The electric motor equipped with deceleration device according to claim 1, wherein the fixed gear is attached to the power supply device.

* * * * *